US00RE48074E

(19) United States
(12) Reissued Patent
Yamamoto

(10) Patent Number: US RE48,074 E
(45) Date of Reissued Patent: Jun. 30, 2020

(54) IMAGE ENCODING DEVICE AND IMAGE DECODING DEVICE

(71) Applicant: VELOS MEDIA, LLC, Plano, TX (US)

(72) Inventor: Tomoyuki Yamamoto, Sakai (JP)

(73) Assignee: Velos Media, LLC, Dallas, TX (US)

(21) Appl. No.: 16/003,908

(22) Filed: Jun. 8, 2018

Related U.S. Patent Documents

Reissue of:
(64) Patent No.: 9,832,465
Issued: Nov. 28, 2017
Appl. No.: 13/579,617
PCT Filed: Dec. 27, 2010
PCT No.: PCT/JP2010/073618
§ 371 (c)(1),
(2) Date: Aug. 17, 2012
PCT Pub. No.: WO2011/104993
PCT Pub. Date: Sep. 1, 2011

(30) Foreign Application Priority Data

Feb. 24, 2010 (JP) ..... 2010-039293

(51) Int. Cl.
*H04N 19/46* (2014.01)
*H04N 19/11* (2014.01)
(Continued)

(52) U.S. Cl.
CPC ..... *H04N 19/11* (2014.11); *H04N 19/197* (2014.11); *H04N 19/46* (2014.11); *H04N 19/70* (2014.11)

(58) Field of Classification Search
CPC ..... H04N 19/11; H04N 19/197; H04N 19/46; H04N 19/70
See application file for complete search history.

(56) References Cited

U.S. PATENT DOCUMENTS 5,859,672 A 1/1999 Kawahara
6,765,964 B1 * 7/2004 Conklin ..... H04N 19/50 375/240.14
(Continued)

FOREIGN PATENT DOCUMENTS

EP 1653745 A2 5/2006
JP 7-177519 A 7/1995
(Continued)

OTHER PUBLICATIONS

Microsoft Computer Dictionary, Fifth Edition, Microsoft Press, Redmond, WA, 2002 , p. 149.*
(Continued)

*Primary Examiner* — Yuzhen Ge
(74) *Attorney, Agent, or Firm* — Spencer C. Patterson; Grable Martin Fulton, PLLC

(57) ABSTRACT

An image encoding device includes a first prediction parameter determination section (53) for selecting, for each of prediction units belonging to a first group, a prediction parameter from a basic set; a second prediction parameter determination section (55) for selecting, for each of prediction units belonging to a second group, a prediction parameter from a reduced set (i) including at least a part of the prediction parameter(s) selected by the first prediction parameter determination section (53) and (ii) is constituted by a prediction parameter(s), the number of which is not more than the number of prediction parameters included in the basic set; and a prediction parameter encoding section (243) for encoding (i) information indicating which one of prediction parameters is selected by the first prediction parameter determination section (53) and (ii) information indicating which one of prediction parameters is selected by the second prediction parameter determination section (55).

5 Claims, 15 Drawing Sheets

(51) Int. Cl.
*H04N 19/196* (2014.01)
*H04N 19/70* (2014.01)

(56) References Cited

U.S. PATENT DOCUMENTS

| | | | | |
|---|---|---|---|---|
| 7,031,387 | B2 * | 4/2006 | Jeon | H04N 19/577 348/699 |
| 7,386,048 | B2 | 6/2008 | Sun | |
| 2003/0058238 | A1 * | 3/2003 | Doak et al. | 345/419 |
| 2003/0107815 | A1 * | 6/2003 | Redmond | 359/619 |
| 2003/0223496 | A1 * | 12/2003 | Sun | H04N 19/197 375/240.12 |
| 2004/0008771 | A1 * | 1/2004 | Karczewicz | H04N 19/197 375/240.03 |
| 2004/0091049 | A1 * | 5/2004 | Yamaguchi et al. | 375/240.16 |
| 2004/0213348 | A1 * | 10/2004 | Kim | H04N 19/105 375/240.12 |
| 2005/0276448 | A1 * | 12/2005 | Pryor | 382/103 |
| 2006/0088103 | A1 | 4/2006 | Kanehara | |
| 2006/0262983 | A1 * | 11/2006 | Cheng | H04N 19/147 382/238 |
| 2007/0025444 | A1 * | 2/2007 | Okada | H04N 19/52 375/240.16 |
| 2007/0063997 | A1 * | 3/2007 | Scherer et al. | 345/419 |
| 2007/0160133 | A1 * | 7/2007 | Bao et al. | 375/240.1 |
| 2008/0130988 | A1 * | 6/2008 | Moriya et al. | H04N 19/176 382/166 |
| 2009/0003441 | A1 * | 1/2009 | Sekiguchi et al. | 375/240.13 |
| 2010/0195723 | A1 * | 8/2010 | Ikai | H04N 19/197 375/240.12 |
| 2010/0290532 | A1 | 11/2010 | Yamamoto et al. | |
| 2011/0135000 | A1 * | 6/2011 | Alshina | H04N 19/105 375/240.13 |

FOREIGN PATENT DOCUMENTS

| | | | |
|---|---|---|---|
| JP | 9-261646 | A | 10/1997 |
| JP | 2006-128770 | A | 5/2006 |
| JP | 2006-254347 | A | 9/2006 |
| JP | 2007-189276 | A | 7/2007 |
| WO | 2009/084340 | A1 | 7/2009 |

OTHER PUBLICATIONS

Laroche G. Et al: "RD Optimized Coding for Motion Vector Predictor Selection", IEEE Transactions on Circuits and Systens for Video Technology, IEEE Service Center, Piscataway, NJ, US, vol. 18, No. 9, Sep. 1, 2008, pp. 1247-1257, XP011231739, ISSN; 1051-8215, DOI: 10.1109/TCSVT.2008.928882.

Decision to Refuse EP Application received in European Application No. 10846656.6 dated Sep. 26, 2018, 26 pages.

Jung, Joel, "KTA 1.3 software manual," Document VCEG-AF11, ITU—Telecommunications Standardization Sector Study Group 16 Question 6, Video Coding Experts Group (VCEG), 32st Meeting: San Jose, USA, Apr. 20-21, 2007, 10 pages.

International Telecommunication Union "Series H: Audiovisual and Multimedia Systems", Infrastructure of audiovisual services-Coding of moving video, Advanced video coding for generic audiovisual services, ITU-T Recommendation H.264, pp. 122-124, Nov. 2007.

Joel Jung et al., "Competition-Based Scheme for Motion Vector Selection and Coding", VCEG 29th Meeting; Klagenfurt, Austria, Jul. 17-18, 2006, No. VCEG-AC06, XP030003490.

Yang J et al., "Motion Vector Coding with Optimal PMV Selection", VCEG 35th Meeting: Berlin, Germany, Jul. 16-18, 2008, No. VCEG-AI22, XP030003587.

* cited by examiner

FIG. 9

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

IMAGE ENCODING DEVICE AND IMAGE DECODING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This Application is a Reissue of U.S. Pat. No. 9,832,465 issued on Nov. 28, 2017, which is the National Phase of PCT International Application No. PCT/JP2010/073618 filed on Dec. 27, 2010, which claims the priority benefit under 35 U.S.C. § 119(a) to Japanese Patent Application No. 2010-039293 filed on Feb. 24, 2010, all of which are hereby expressly incorporated by reference into the present application.*

TECHNICAL FIELD

The present invention relates to an image encoding device for generating encoded data by encoding an image. Further, the present invention relates to an image decoding device for decoding the encoded data generated by use of such an image encoding device.

BACKGROUND ART

Video encoding devices have been used for efficiently transmitting or recording videos. Examples of a specific video encoding method employed in a video encoding device encompass H.264/MPEG-4 AVC (described in Non Patent Literature 1) and a method employed in KTA software which is a joint development codec in VCEG (Video Coding Expert Group).

According to such an encoding method, an image (picture) constituting a video is managed in a hierarchical structure which is constituted by (i) a plurality of slices into which the image is divided, (ii) a plurality of macro blocks into which each of the plurality of slices is divided, and (iii) a plurality of sub blocks into which each of the plurality of macro blocks is divided. The encoding is generally carried out per sub block.

Further, according to such an encoding method, a prediction image is generally generated on the basis of a locally-decoded image obtained by encoding/decoding an input image. Difference data between the prediction image and the input image is encoded. Further, examples of a method of generating a prediction image encompass a method called "inter-frame prediction (inter prediction)" and a method called "intra-frame prediction (intra prediction)".

In the inter prediction, (i) motion compensation employing a motion vector is applied to a reference image in such a reference frame that an entire frame is decoded, and, as a result, (ii) a prediction image in a prediction target frame is generated. Further, in the inter prediction, it is possible to generate a prediction image by referring to a plurality of reference images. In this case, the prediction image is generated by use of such a value that a pixel value of each of the plurality of reference images is multiplied by a weighting factor.

Meanwhile, in the intra prediction, prediction images are sequentially generated in such a manner that a prediction image in a frame is generated on the basis of a locally-decoded image in the frame. Specifically, the intra prediction is generally such that (i) one of prediction directions included in a predetermined prediction direction (prediction mode) group is selected for each of a plurality of prediction units (e.g., a sub block) constituting a unit region (e.g., a macro block), (ii) a pixel value of a reference pixel in a locally-decoded image is extrapolated in the one of prediction directions thus selected, and, as a result, (iii) a prediction pixel value(s) on a prediction target region is generated.

As described above, a prediction image is generally generated on the basis of a prediction parameter (such as a motion vector, a weighting factor, and a prediction mode).

CITATION LIST

Non Patent Literature

[Non Patent Literature 1]
ITU-T Recommendation H.264 November 2007 (Publication Date: November in 2007)

SUMMARY OF INVENTION

Technical Problem

However, in order to generate appropriately a prediction image by a video decoding device, it is necessary to (i) encode a prediction parameter used in the video encoding device and (ii) transmit the encoded parameter to the video decoding device. For this reason, there is a problem of an increase in an encoding amount of encoded data due to the prediction parameter.

For example, in the conventional intra prediction described above, it is necessary to encode (i) the difference data and (ii) prediction mode information indicating which prediction mode is selected with respect to each of prediction target regions. Accordingly, there is a problem of an increase in an encoding amount of encoded data due to the prediction mode information.

The present invention is made in view of the problems. An object of the present invention is to provide (i) an image encoding device which can reduce, without sacrificing encoding efficiency, an encoding amount necessary to designate a prediction parameter, and (ii) an image decoding device which can decode encoded data generated by such an image encoding device.

Solution to Problem

In order to attain the object, an image encoding device of the present invention, for encoding a difference between an input image and a prediction image, includes: classification means for (i) dividing a prediction image into a plurality of unit regions and (ii) classifying a plurality of prediction units included in each of the plurality of unit regions into a first group and a second group; first selection means for selecting, for each of a plurality of prediction units belonging to the first group, a prediction parameter designating how to generate a prediction image, the first selection means selecting the prediction parameter from a basic set constituted by predetermined prediction parameters; second selection means for selecting, for each of a plurality of prediction units belonging to the second group, a prediction parameter designating how to generate a prediction image, the second selection means selecting the prediction parameter from a reduced set which (i) includes at least a part of the prediction parameter(s) selected by the first selection means and (ii) is constituted by a prediction parameter(s), the number of which is not more than the number of prediction parameters included in the basic set; and prediction parameter encoding means for encoding (i) information indicating which one of prediction parameters is selected, for each of the plurality of prediction units belonging to the first group, by the first selection means and (ii) information indicating which one of prediction parameters is selected, for each of the plurality of prediction units belonging to the second group, by the second selection means.

According to the image encoding device having the arrangement described above, for each of the plurality of prediction units belonging to the second group, a prediction parameter designating how to generate a prediction image is selected from the reduced set which (i) includes at least a part of the prediction parameter(s) selected by the first selection means for each of the plurality of prediction units belonging to the first group which is included in the unit region in which the second group is included, and (ii) is constituted by a prediction parameter(s), the number of which is not more than the prediction parameters included in the basic set. The information indicating which one of prediction parameters is selected by the second selection means is encoded.

Here, generally, a prediction parameter with respect to each of the plurality of prediction units has a correlation with a prediction parameter with respect to another prediction unit located in the vicinity of the prediction unit. For this reason, the prediction parameter selected with respect to each of the plurality of prediction units belonging to the first group is highly likely to be an optimum prediction parameter with respect to each of the plurality of prediction units belonging to the second group. That is, the parameter selected from the reduced set is highly likely to be an optimum prediction parameter with respect to each of the plurality of prediction units belonging to the second group. Accordingly, with the arrangement described above, it is possible to encode a prediction parameter without having a reduction in encoding efficiency.

Further, with the arrangement described above, the reduced set includes at least a part of the prediction parameter(s) selected by the first selection means, and is constituted by a prediction parameter(s), the number of which is not more than the number of prediction parameters included in the basic set. Accordingly, for each of the plurality of prediction units belonging to the second group, it is possible to have a reduction in encoding amount of information indicating which one of prediction parameters has been selected.

With the arrangement described above, it is therefore possible to have a reduction in encoding amount of information designating a prediction parameter, without having a reduction in encoding efficiency.

Further, an image encoding device of the present invention, for encoding a difference between an input image and a prediction image, includes: selection means for selecting, for each of a plurality of prediction units, a prediction parameter designating how to generate a prediction image, the selection means selecting the prediction parameter from a reduced set including at least a part of a prediction parameter(s) designating how to generate a prediction image(s) for a prediction unit(s) which (i) is located in the vicinity of a corresponding one of the plurality of prediction units and (ii) has been encoded; and prediction parameter encoding means for encoding, for each of the plurality of prediction units, information indicating which one of prediction parameters has been selected by the selection means.

Generally, a prediction parameter with respect to each of a plurality of prediction units has a correlation with a prediction parameter with respect to another prediction unit located in the vicinity of the prediction unit. Accordingly, the reduced set is highly likely to include an optimum prediction parameter in generation of a prediction image of each of the plurality of prediction units. Further, the reduced set is constituted by at least a part of the prediction parameter(s) with respect to the prediction unit(s) which is located in the vicinity of a corresponding one of the plurality of prediction units. Accordingly, the number of prediction parameters included in the reduced set is smaller than the number of prediction parameters included in a parameter set constituted by prediction parameters with respect to prediction units other than the each of the plurality of prediction units.

According to the image encoding device of the present invention, having the arrangement described above, it is therefore possible to generate encoded data whose encoding amount is small, without sacrificing encoding efficiency.

Furthermore, an image decoding device of the present invention, for decoding encoded data which is obtained in such a manner that (i) a difference between an original image and a prediction image is encoded for each of a plurality of prediction units, and, simultaneously, (ii) selection information is encoded, the selection information indicating which one of a plurality of prediction parameters, each designating how to generate a prediction image, is selected for each of the plurality of prediction units, includes: classification means for classifying a plurality of prediction units included in each of a plurality of unit regions constituting the prediction image into a first group and a second group; first selection means for selecting, for each of the plurality of prediction units belonging to the first group, a prediction parameter designating how to generate a prediction image, the first selection means selecting, by referring to selection information for each of a plurality of prediction units belonging to the first group, the prediction parameter from a basic set constituted by predetermined prediction parameters; and second selection means for selecting, for each of the plurality of prediction parameters belonging to the second group, a prediction parameter designating how to generate a prediction image, the second selection means selecting, by referring to selection information for each of a plurality of prediction units belonging to the second group, the prediction parameter from a reduced set which (i) includes at least a part of the prediction parameter(s) selected by the first selection means and (ii) is constituted by a prediction parameter(s), the number of which is not more than the number of the predetermined prediction parameters included in the basic set.

According to the image decoding device having the arrangement described above, it is possible to select, for each of the plurality of prediction units belonging to the second group, a prediction parameter designating how to generate a prediction image, from the reduced set which (i) includes at least a part of the prediction parameter(s) selected by the first selection means for each of the plurality of prediction units belonging to the first group which is included in the unit region to which the second group belongs, and (ii) is constituted by a prediction parameter(s), the number of which is not more than the number of prediction parameters included in the basic set.

Here, generally, a prediction parameter with respect to each of the prediction units has a correlation with a prediction parameter with respect to another prediction unit located in the vicinity of the prediction unit. Accordingly, the prediction parameter selected for each of the plurality of prediction units belonging to the first group is highly likely to be an optimum prediction parameter with respect to each of the plurality of prediction units belonging to the second group. With the arrangement described above, it is therefore possible to decode, without having a reduction in encoding efficiency, the prediction parameter from selection information having a reduction in encoding amount.

Moreover, an image decoding device of the present invention, for decoding encoded data which is obtained in such a manner that (i) a difference between an input image and a prediction image is encoded for each of a plurality of prediction units, and, simultaneously, (ii) selection information is encoded, the selection information indicating which one of a plurality of prediction parameters, each designating how to generate a prediction image, is selected for each of the plurality of prediction units, includes: selection means for selecting, for each of a plurality of prediction units, a prediction parameter designating how to generate a prediction image, the selection means selecting the prediction parameter from a reduced set including at least a part of a prediction parameter(s) designating how to generate a prediction image(s) for a prediction unit(s) which (i) is located in the vicinity of a corresponding one of the plurality of prediction units and (ii) has been decoded.

Generally, a prediction parameter with respect to each of a plurality of prediction units has a correlation with a prediction parameter with respect to another prediction unit located in the vicinity of the prediction unit. Accordingly, the reduced set is highly likely to include an optimum prediction parameter in generation of a prediction image of each of the plurality of prediction units. Further, the reduced set is constituted by at least a part of the prediction parameter(s) with respect to the prediction unit(s) which is located in the vicinity of a corresponding one of the plurality of prediction units. Accordingly, the number of prediction parameters included in the reduced set is smaller than the number of prediction parameters included in a parameter set constituted by prediction parameters with respect to prediction units other than the each of the plurality of prediction units.

According to an image encoding device having an arrangement corresponding to the arrangement described above, it is therefore possible to generate encoded data whose encoding amount is small, without sacrificing encoding efficiency.

The image decoding device having the arrangement described above can decode the encoded data whose encoding amount is small as described above.

Further, a data structure of the present invention, for encoded data which is obtained in such a manner that (i) a difference between an input image and a prediction image is encoded for each of a plurality of prediction units, and, simultaneously, (ii) selection information is encoded, the selection information indicating which one of a plurality of prediction parameters, each designating how to generate a prediction image, is selected for each of the plurality of prediction units, includes: selection information which is referred to in an image decoding device for decoding the encoded data, so as to select, for each of the plurality of prediction units, a prediction parameter designating how to generate a prediction image, the prediction parameter being selected from a reduced set which includes at least a part of a prediction parameter(s) designating how to generate a prediction image(s) for a prediction unit(s) which (i) is located in the vicinity of a corresponding one of the plurality of prediction units and (ii) has been decoded.

Generally, a prediction parameter with respect to each of a plurality of prediction units has a correlation with a prediction parameter with respect to another prediction unit located in the vicinity of the prediction unit. Accordingly, the reduced set is highly likely to include an optimum prediction parameter in generation of a prediction image of each of the plurality of prediction units. Further, the reduced set is constituted by at least a part of the prediction parameter(s) with respect to the prediction unit(s) which is located in the vicinity of a corresponding one of the plurality of prediction units. Accordingly. the number of prediction parameters included in the reduced set is smaller than the number of prediction parameters included in a parameter set constituted by prediction parameters with respect to prediction units other than the each of the plurality of prediction units.

Accordingly, the encoded data having the structure described above is the encoded data, whose encoding amount is reduced without sacrificing encoding efficiency.

Advantageous Effects of Invention

As described above, an image encoding device of the present invention, for encoding a difference between an input image and a prediction image, includes: classification means for (i) dividing a prediction image into a plurality of unit regions and (ii) classifying a plurality of prediction units included in each of the plurality of unit regions into a first group and a second group; first selection means for selecting, for each of a plurality of prediction units belonging to the first group, a prediction parameter designating how to generate a prediction image, the first selection means selecting the prediction parameter from a basic set constituted by predetermined prediction parameters; second selection means for selecting, for each of a plurality of prediction units belonging to the second group, a prediction parameter designating how to generate a prediction image, the second selection means selecting the prediction parameter from a reduced set which (i) includes at least a part of the prediction parameter(s) selected by the first selection means and (ii) is constituted by a prediction parameter(s), the number of which is not more than the number of prediction parameters included in the basic set; and prediction parameter encoding means for encoding (i) information indicating which one of prediction parameters is selected, for each of the plurality of prediction units belonging to the first group, by the first selection means and (ii) information indicating which one of prediction parameters is selected, for each of the plurality of prediction units belonging to the second group, by the second selection means.

According to the image encoding device having the arrangement described above, it is possible to reduce, without sacrificing encoding efficiency, an encoding amount necessary to designate a prediction parameter.

BRIEF DESCRIPTION OF DRAWINGS

FIG. 9 is an explanatory view showing an operation of generating a prediction image by a prediction image generation section included in the MB decoding section, specifically, showing each of a plurality of pixels (4×4) of a prediction target sub block and pixels in the vicinity of the prediction target sub block.

DESCRIPTION OF EMBODIMENTS (Video Decoding Device)

An arrangement of a video decoding device (image decoding device) 1 in accordance with an embodiment of the present invention is described below with reference to FIGS. 1 through 9. The video decoding device 1 employs, in a part of the video decoding device 1, a technique adopted in an H.264/MPEG-4 AVC standard.

To put it shortly, the video decoding device 1 generates a decoded image #2 by decoding encoded data #1 supplied to the video decoding device 1, and outputs the decoded image #2 thus generated.

Further, a video decoding device 1 divides a unit region on an image indicated by the encoded data #1 into a plurality of prediction target regions (prediction units), and generates the decoded image #2 by use of a prediction image generated for each of the plurality of prediction target regions.

The following description deals with, as an example, a case where the unit region is a macro block defined in the H.264/MPEG-4 AVC standard, and the prediction target region is a sub block in the macro block. Note, however, that the present invention is not limited to this. For example. the unit region may be a region larger than the macro block, or a region which overlaps a plurality of macro blocks.

Figure 1:
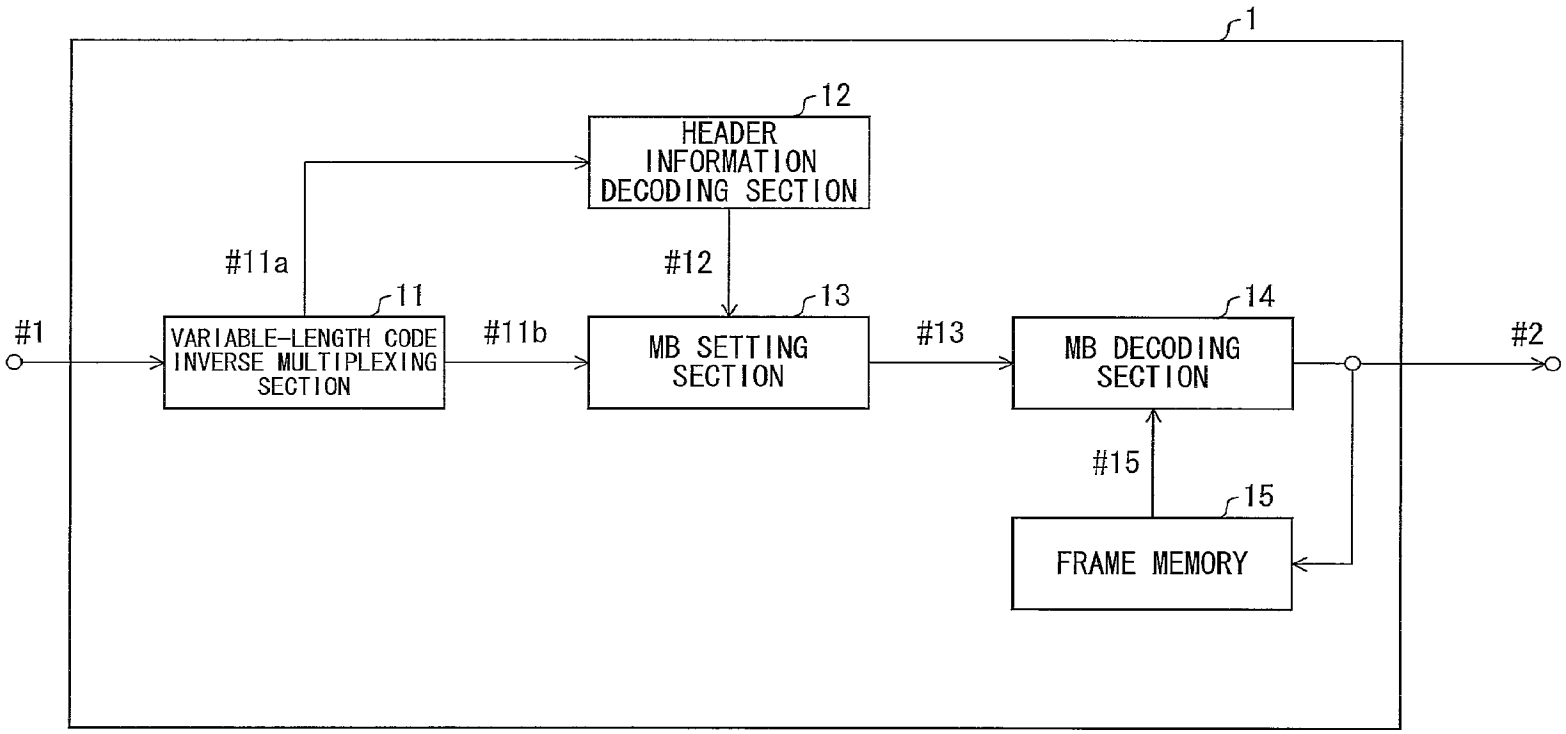
FIG. 1 is a block diagram illustrating an arrangement of a video decoding device in accordance with an embodiment of the present invention.

FIG. 1 is a block diagram illustrating an arrangement of the video decoding device 1. The video decoding device 1 includes a variable-length code inverse multiplexing section 11, a header information decoding section 12, an MB setting section 13, an MB decoding section 14, and a frame memory 15 (see FIG. 1).

The encoded data #1 supplied to the video decoding device 1 is inputted into the variable-length code inverse multiplexing section 11. The variable-length code inverse multiplexing section 11 inverse-multiplexes the encoded data #1 to separate the encoded data #1 into (i) header encoded data #11a which is encoded data related to header information and (ii) MB encoded data #11b which is encoded data related to macro blocks (unit regions). The variable-length code inverse multiplexing section 11 then outputs the header encoded data #11a to the header information decoding section 12 and the MB encoded data #11b to the MB setting section 13.

The header information decoding section 12 decodes header information #12 from the header encoded data #11a. Here, the header information #12 is information including a size of an input image.

On the basis of the header information #12 thus received, the MB setting section 13 separates out, from the MB encoded data #11b, encoded data #13 which corresponds to each of a plurality of macro blocks. Then, the MB setting section 13 successively outputs the encoded data #13 to the MB decoding section 14.

The MB decoding section 14 generates a decoded image #2 corresponding to each of the plurality of macro blocks by successively decoding the encoded data #13 corresponding to each of the plurality of macro blocks, and then, outputs the decoded images #2. Further, the MB decoding section 14 also outputs the decoded image #2 to the frame memory 15. Details of an arrangement of the MB decoding section 14 will be described later, and therefore an explanation of the arrangement of the MB decoding section 14 is omitted here.

The decoded image #2 is stored in the frame memory 15. At the time that a certain macro block is decoded, decoded images corresponding to all the macro blocks which were previously provided in a raster scan order with respect to the certain macro block has been stored in the frame memory 15.

When the MB decoding section 14 completes a process of generating a decoded image, per macro block, with respect to all the plurality of macro blocks in an image, a process of generating the decoded image #2 corresponding to the encoded data supplied to the video decoding device 1 is completed.

(MB Decoding Section 14)

The following description specifically deals with details of the MB decoding section 14 with reference to another drawing.

Figure 2:
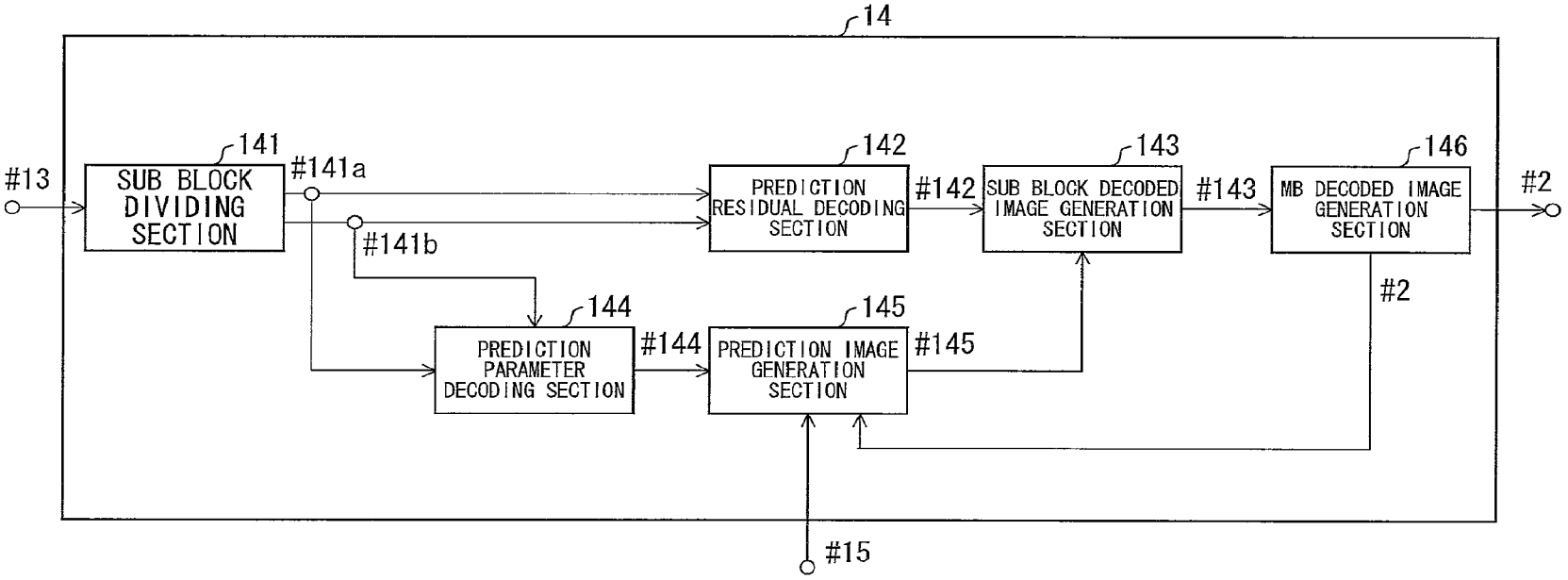
FIG. 2 is a block diagram illustrating an arrangement of an MB decoding section included in the video decoding device in accordance with the embodiment of the present invention.

FIG. 2 is a block diagram illustrating an arrangement of the MB decoding section 14. The MB decoding section 14 includes a sub block dividing section 141, a prediction residual decoding section 142, a sub block decoded image generation section 143, a prediction parameter decoding section 144, a prediction image generation section 145, and an MB decoded image generation section 146 (see FIG. 2).

The sub block dividing section 141 is started up when the encoded data #13 (unit: macro block) is supplied to the sub block dividing section 141. The sub block dividing section 141 sequentially outputs, in a predetermined order, (i) sub block position information #141a indicating a position of each of a plurality of sub blocks (prediction target regions) in a macro block (unit region) which is constituted by the plurality of sub blocks, and (ii) sub block encoded data #141b which is encoded data related to the sub block indicated by the sub block position information #141a. Note that a method used by the video encoding device for generating the encoded data #1 can be applied to a method of dividing the macro block into the plurality of sub blocks.

Further, it is preferable that the sub block dividing section 141 outputs sub block position information #141a and sub block encoded data #141b, both of which are related to each of a plurality of sub blocks belonging to a first group (later described), and then outputs sub block position information #141a and sub block encoded data #141b, both of which are related to each of a plurality of sub blocks belonging to a second group (later described). For example, it is preferable that the plurality of sub blocks belonging to the first group are scanned in a raster scan order, and then, the plurality of sub blocks belonging to the second group are scanned in the raster scan order. Furthermore, it is also possible that the sub block dividing section 141 outputs the sub block position information #141a and the sub block encoded data #141b in an order which is identical with an order used by the video encoding device for generating the encoded data #1.

The prediction residual decoding section 142 applies variable-length encoding/decoding to the sub block encoded data #141b thus inputted, so as to generate a transform coefficient with respect to the sub block indicated by the sub block position information #141a thus inputted. Further, the prediction residual decoding section 142 applies, to the transform coefficient thus generated, inverse transformation of DCT (Discrete Cosine Transform) having the same size as that of the sub block indicated by the sub block position information #141a, so as to generate a decoded residual #142. Then, the prediction residual decoding section 142 outputs the decoded residual #142.

The prediction parameter decoding section 144 decodes, in accordance with the sub block position information #141a and the sub block encoded data #141b, a prediction parameter #144 with respect to each of the plurality of sub blocks, and then, outputs the prediction parameter #144.

Here, the prediction parameter is a parameter used to generate a prediction image. Examples of the prediction parameter encompass a prediction mode in intra prediction, a motion vector in motion compensation prediction, and a weighting factor in luminance compensation prediction.

Moreover, the prediction parameter #144 includes a prediction parameter #43 outputted from a first prediction parameter decoding section 43 (later described) and a prediction parameter #45 outputted from a second prediction parameter decoding section 45 (later described). Details of an arrangement of the prediction parameter decoding section 144 and details of how the prediction parameter decoding section 144 operates will be described later, and therefore explanations of these are omitted here.

In accordance with the prediction parameter #144, the decoded image #2, and a decoded image #15 stored in the frame memory 15, the prediction image generation section 145 generates a prediction image #145 corresponding to the prediction target sub block. Then, the prediction image generation section 145 outputs the prediction image #145. A specific method of generating the prediction image #145 by the prediction image generation section 145 will be described later, and therefore an explanation of the method is omitted here.

The sub block decoded image generation section 143 adds the prediction image #145 to a decoded residual #142, so as to generate a sub block decoded image #143 whose unit is a sub block. Then, the sub block decoded image generation section 143 outputs the sub block decoded image #143.

The MB decoded image generation section 146 accumulates, for each of the plurality of macro blocks, the sub block decoded images #143 whose unit is a sub block, and integrates, with each other, all the sub block decoded images #143 constituting the macro block. The MB decoded image generation section 146 thus generates a decoded image #2 whose unit is a macro block, and then outputs the decoded image #2. The decoded image #2 thus generated is also supplied to the prediction image generation section 145.

(Prediction Parameter Decoding Section 144)

Figure 3:
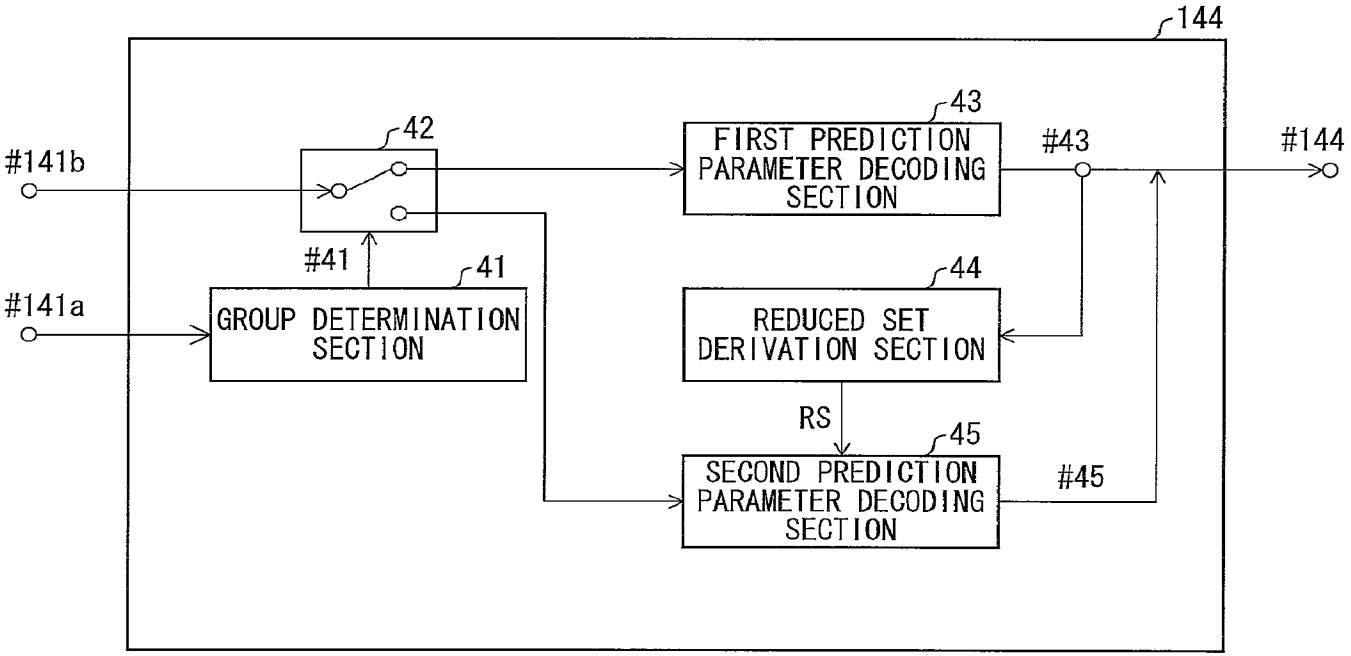
FIG. 3 is a block diagram illustrating an arrangement of a prediction parameter decoding section included in the video decoding device in accordance with the embodiment of the present invention.

Next, the following description deals with the arrangement of the prediction parameter decoding section 144 with reference to FIG. 3.

FIG. 3 is a block diagram illustrating the arrangement of the prediction parameter decoding section 144. The prediction parameter decoding section 144 includes a group determination section 41, a switch section 42, the first prediction parameter decoding section 43, a reduced set derivation section 44, and the second prediction parameter decoding section 45 (see FIG. 3).

(Group Determination Section 41)

The group determination section 41 determines which group the sub block indicated by the sub block position information #141a belongs to, among a plurality of predetermined groups. Then, the group determination section 41 outputs, to the switch section 42, group information #41 indicating a result of the determination.

Here, the plurality of predetermined groups may be, for example, a plurality of groups into which a plurality of sub blocks have been classified in the video encoding device for generating the encoded data #1. That is, in the video encoding device for generating the encoded data #1, each of sub blocks SB1 through SBNs (Ns is a total number of the sub blocks belonging to a macro block MB) belonging to a certain macro block MB is classified into a corresponding one of groups GP1 through GPM (M is a total number of groups into which the sub blocks belonging to the macro block MB are classified) in accordance with a predetermined classification method. In a case where a sub block SBn is classified into a group GPm, the group determination section 41 determines, on the basis of the predetermined classification method, for example, that the sub block SBn indicated by the sub block position information #141a belongs to the group GPm.

Figure 4:
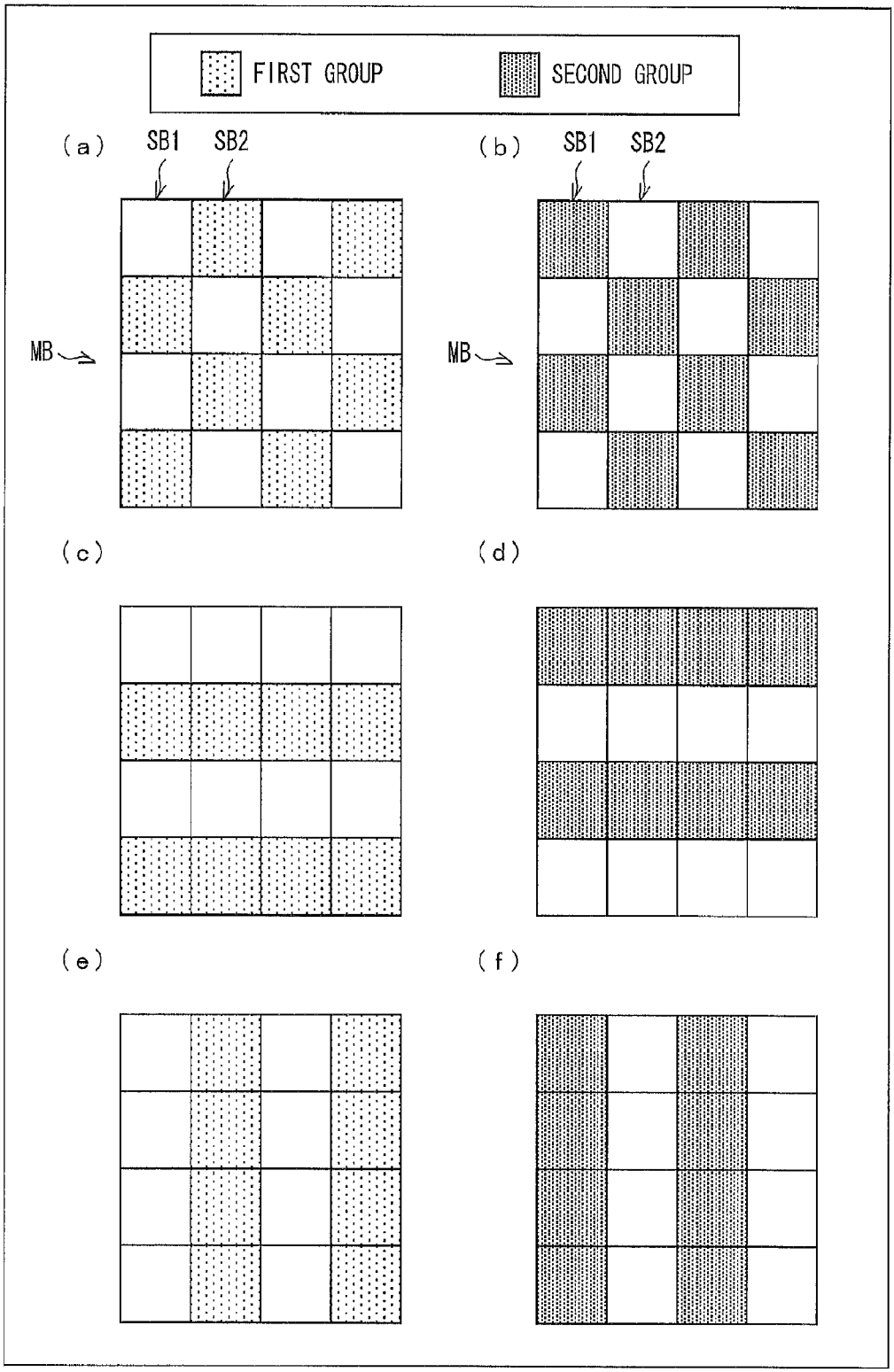
FIG. 4 is an explanatory view showing how a group determination section included in the prediction parameter decoding section operates: (a) and (b) of FIG. 4 show how 16 sub blocks included in a macro block are classified into a first group and a second group in accordance with a classification method A; (c) and (d) of FIG. 4 show how the 16 sub blocks are classified into the first block and the second block in accordance with a classification method B; and (e) and (f) of FIG. 4 show how the 16 sub blocks are classified into the first group and the second group in accordance with a classification method C.

The following description deals with an example of how sub blocks are classified into 2 groups, with reference to (a) through (f) of FIG. 4.

(a) and (b) of FIG. 4 show how 16 sub blocks included in a macro block MB are classified into a first group and a second group in accordance with a classification method A. (c) and (d) of FIG. 4 show how the sub blocks are classified in accordance with a classification method B. (e) and (f) of FIG. 4 show how the sub blocks are classified in accordance with classification method C.

The sub blocks included in the macro block MB may be classified into the first group and the second group so that (i) the sub blocks included in the first group and the sub blocks included in the second group are arranged in a checkered flag pattern, as shown in (a) and (b) of FIG. 4, (ii) the sub blocks included in the first group are adjacent to each other only in a horizontal direction, and the sub blocks included in the second blocks are adjacent to each other only in the horizontal direction, as shown in (c) and (d) of FIG. 4, or (iii) the sub blocks included in the first group are adjacent to each other only in a vertical direction, and the sub blocks included in the second group are adjacent to each other only in the vertical direction, as shown in (e) and (f) of FIG. 4.

Generally, an optimum classification method differs in accordance with a spatial correlation between prediction parameters in the macro block. The aforementioned classification method A is effective in a case where a vertical spatial correlation or a horizontal spatial correlation exists. Meanwhile, in a case where there is an edge in an oblique direction in the macro block, the aforementioned classification methods B and C are more effective than the classification method A.

With any one of the aforementioned classification methods, the sub blocks are classified into the first group and the second group in accordance with positions of the sub blocks in the macro block, as is clear from (a) through (f) of FIG. 4.

The group determination section 41 refers to the sub block position information #141a, and determines, on the basis of the classification method used by the video encoding device for generating the encoded data #1, which one of the first group and the second group the sub block indicated by the sub block position information #141a belongs to.

For example, in a case where the video encoding device for generating the encoded data #1 classifies, on the basis of the classification method A, the sub block SB1 belonging to the macro block MB into the second group, and the sub block SB2 into the first group (as shown in (a) and (b) of FIG. 4), the group determination section 41 determines, by referring to the sub block position information #141a, on the basis of the classification method A, that the sub block SB2 belongs to the first group and the sub block SB1 belongs to the second group. As to the other sub blocks included ion the macro block MB, the group determination section 41 carries out the determination in the same manner as the sub blocks SB1 and SB2.

Further, in a case where the video encoding device for generating the encoded data #1 employs different classification methods for respective macro blocks, it is preferable that the encoded data #1 includes a flag indicating which one of classification methods has been used for a corresponding macro block. By referring to such a flag, the group determination section 41 can carry out the determination on the basis of the classification method used by the video encoding device, even in a case where different classification methods are used for respective macro blocks.

In the above explanations. the number of sub blocks included in the macro block is 16. Note, however, that the present invention is not limited to this arrangement (this also applies to the following cases). Further, how to classify the sub blocks in the macro block is not limited to the aforementioned classification methods, and other classification methods can be employed. For example, it is possible to employ such a classification method that the number of the sub blocks belonging to the first group and the number of the sub blocks belonging to the second group are different from each other (this also applies to the following cases).

(Switch Section 42)

On the basis of the group information #41, the switch section 42 transmits, to one of the first prediction parameter decoding section 43 and the second prediction parameter decoding section 45, the sub block encoded data #141b which is encoded data related to the sub block indicated by the sub block position information #141a.

Specifically, in a case where the group determination section 41 determines that the sub block indicated by the sub block position information #141a belongs to the first group, the switch section 42 transmits the sub block encoded data #141b to the first prediction parameter decoding section 43. On the other hand, in a case where the group determination section 41 determines that the sub block indicated by the sub block position information #141a belongs to the second group, the switch section 42 transmits the sub block encoded data #141b to the second prediction parameter decoding section 45.

(First Prediction Parameter Decoding Section 43)

The first prediction parameter decoding section 43 decodes the sub block encoded data #141b so as to decode the prediction parameter #43, which has been used by the video encoding device for generating the encoded data #1 to predict the sub block (prediction target sub block) indicated by the sub block position information #141a. Then, the first prediction parameter decoding section 43 outputs the prediction parameter #43.

More specifically, the first prediction parameter decoding section 43 first sets, as an estimate value with respect to the prediction target sub block, the prediction parameter which (i) has been used in prediction of a sub block located on an upper side (or on a left side) with respect to the prediction target sub block, and (ii) has been decoded.

Next, the first prediction parameter decoding section 43 decodes a flag included in the sub block encoded data #141b.

In a case where the flag indicates that the estimate value is to be used, the first prediction parameter decoding section 43 sets the estimate value as the prediction parameter with respect to the prediction target sub block. On the other hand, in a case where the flag indicates that the estimate value is not to be used, the first prediction parameter decoding section 43 sets a prediction parameter decoded from a part other than a part of the flag, as the prediction parameter with respect to the prediction target sub block.

In a case where the sub block located on the upper side (or on the left side) with respect to the prediction target sub block has not been decoded, the first prediction parameter decoding section 43 may refer to, as the estimate value, a prediction parameter used in prediction of a sub block which (i) is located on the upper side (or on the left side) with respect to the prediction target sub block, (ii) has been decoded, and (iii) is located in a position closest to the prediction target sub block among the sub blocks which have been decoded.

Note that the prediction parameter #43 thus decoded is also supplied to the reduced set derivation section 44.

With the operations described above, the reduced set derivation section 44 is supplied with the prediction parameter #43 decoded from each of the plurality of sub blocks belonging to the first group.

(Reduced Set Derivation Section 44)

The reduced set derivation section 44 accumulates the prediction parameters #43, so as to generate a reduced prediction parameter set RS (hereinafter, referred to as "reduced set RS"). Here, the reduced set RS is a set including the prediction parameter #43 decoded from each of the plurality of sub blocks belonging to the first group. Further, the reduced set RS may include another prediction parameter other than the prediction parameter #43.

Furthermore, in a case where the same parameter is decoded from a plurality of sub blocks, among the plurality of sub blocks belonging to the first group, the reduced set derivation section 44 generates such a reduced set RS that one prediction parameter is included for the plurality of sub blocks from which the same parameter is decoded. In other words, the reduction set derivation section 44 generates the reduced set RS so that there are no prediction parameters which are identical with each other in the reduced set RS. For example, in a case where, among the sub blocks SB1 through SB16 belonging to the first group, a prediction parameter PP1 is decoded from each of the sub blocks SB1 through SB8, and a prediction parameter PP2 is decoded from each of the sub blocks SB9 through SB16, the reduced set derivation section 44 generates a reduced set RS which includes one prediction parameter PP1 and one prediction parameter PP2.

The following description deals with an example in which a prediction parameter is an intra prediction mode defined in the H.264/MPEG-4 AVC standard. How the reduced set derivation section 44 generates a reduced set RS is described below with reference to FIG. 5, and (a) through (c) of FIG. 6.

Figure 5:
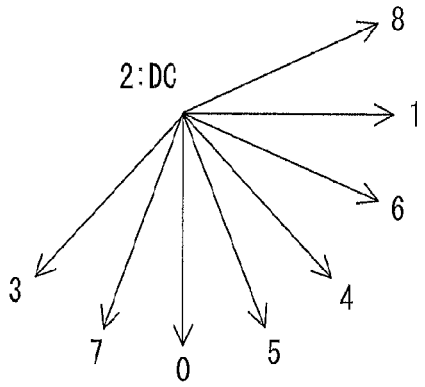
FIG. 5 is a view showing (i) intra prediction modes used in intra prediction in compliance with an H.264/MPEG-4 AVC standard and (ii) indexes attached to the respective intra prediction modes.

FIG. 5 is a view showing (i) intra prediction modes (hereinafter, referred to as "prediction modes") used in the intra prediction defined in the H.264/MPEG-4 AVC standard and (ii) an index attached to each of the prediction modes. Each of the intra prediction modes indicates a prediction direction used in the intra prediction. According to the H.264/MPEG-4 AVC standard, prediction modes of 8 directions (corresponding to indexes of 0, 1, and 3 through 8), and a DC prediction mode (corresponding to an index of 2) are used (see FIG. 5). Hereinafter, a prediction mode designated with an index I is referred to as "prediction mode I". Further, a parameter set constituted by the prediction modes 0 through 8 is referred to as "basic parameter set".

(Example 1 of Generation of Reduced Set RS)

Figure 6:
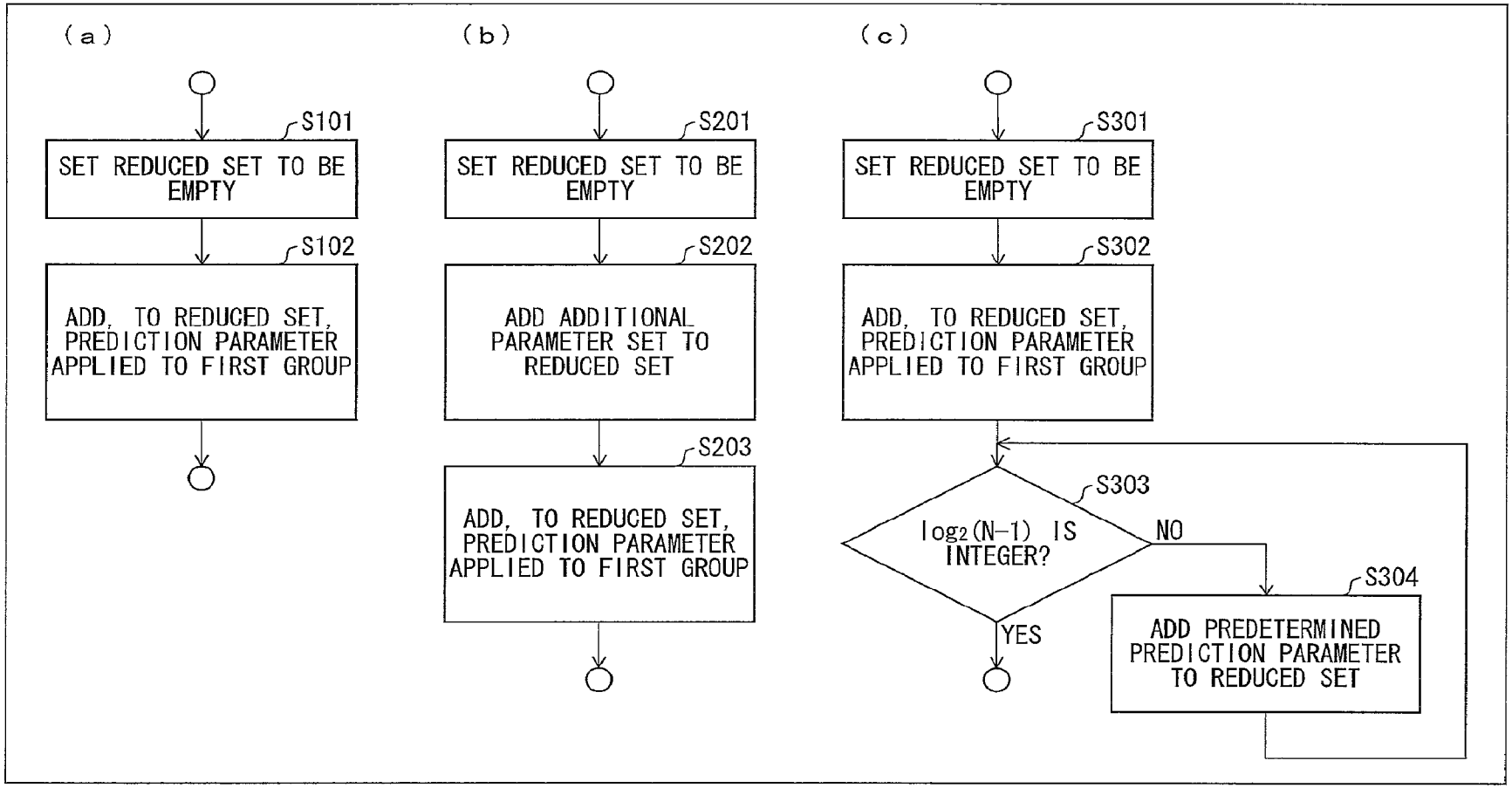
FIG. 6 is an explanatory view showing how a reduced set derivation section included in the prediction parameter decoding section operates: (a) of FIG. 6 is a flow chart showing a first example of an operation of generating a reduced set by the reduced set derivation section; (b) of FIG. 6 is a flow chart showing a second example of the operation of generating the reduced set by the reduced set derivation section; and (c) of FIG. 6 is a flow chart showing a third example of the operation of generating the reduced set by the reduced set derivation section.

(a) of FIG. 6 is a flow chart showing a first example of how the reduced set derivation section 44 generates a reduced set RS.

As shown in (a) of FIG. 6, first, the reduced set derivation section 44 sets the reduced set RS to be empty, so as to initialize the reduced set RS (Step S101).

Next, the reduced set derivation section 44 adds, to the reduced set RS, the prediction parameter #43 decoded from each of the plurality of sub blocks belonging to the first group (Step S102). For example, in a case where a prediction mode 1, a prediction mode 6, and a prediction mode 8 are decoded from the plurality of sub blocks belonging to the first group, the reduction set derivation section 44 adds the prediction mode 1, the prediction mode 6, and the prediction mode 8 to the reduced set RS.

According to the first example, with the operations described above, it is possible for the reduced set derivation section 44 to generate the reduced set RS constituted by the prediction parameter #43 decoded from each of the plurality of sub blocks belonging to the first group.

Generally, there is a correlation between optimum prediction parameters with respect to a plurality of sub blocks constituting a macro block. Accordingly, the prediction parameters selected with respect to the plurality of sub blocks belonging to the first group are highly likely to be optimum prediction parameters with respect to the plurality of sub blocks belonging to the second group. Further, the number of prediction modes included in the reduced set RS is smaller than the number of prediction parameters included in the basic parameter set.

Accordingly, the video encoding device for generating the encoded data #1, having an arrangement corresponding to the arrangement of the present example, can generate, without sacrificing encoding efficiency, the encoded data #1 whose encoding amount is small. Further, the video decoding device 1 having the arrangement of the present example can decode the encoded data #1 thus generated, whose encoding amount is small.

(Second Example of Generation of Reduced Set RS)

(b) of FIG. 6 is a flow chart showing a second example of how the reduced set derivation section 44 generates a reduced set RS.

As shown in (b) of FIG. 6, the reduced set derivation section 44 first sets the reduced set RS to be empty, so as to initialize the reduced set RS (Step S201).

Next, the reduced set derivation section 44 adds an additional parameter set AS to the reduced set RS (Step S202). Here, it is preferable that the additional parameter set AS includes a prediction parameter(s) which tends to be used frequently. According to the H.264/MPEG-4 AVC standard, generally, the smaller an index designating a prediction mode is, the more frequently the prediction mode tends to be used in the intra prediction. Accordingly, it is preferable that the additional parameter set AS includes a prediction mode designated with a small index among the indexes 0 through 8. For example, it is preferable that the additional parameter set AS includes the prediction mode 0 (the vertical direction prediction mode), the prediction mode 1 (the horizontal direction prediction mode), and the prediction mode 2 (the DC prediction mode).

Further, it is also possible that the additional parameter set AS includes at least one of the prediction mode 0, the prediction mode 1, and the prediction mode 2.

Next, the reduced set derivation section 44 adds, to the reduced set RS, the prediction parameter #43 decoded from each of the plurality of sub blocks belonging to the first group (Step S203). Note, however, that it is preferable that, among the prediction parameter #43, the reduced set derivation section 44 does not add, to the reduced set RS, the prediction parameter which has been already included in the reduced set RS. That is, it is preferable that the reduced set RS include no prediction parameters identical with each other. For example, in a case where the prediction mode 1 and the prediction mode 4 is obtained as the prediction parameter #43, and the reduced set RS has already included the prediction mode 1 and the prediction mode 2, the reduced set derivation section 44 adds only the prediction mode 4 to the reduced set RS.

According to the second example, with the operations described above, it is possible for the reduced set derivation section 44 to generate the reduced set RS which is constituted by (i) the prediction parameter #43 decoded from each of the plurality of sub blocks belonging to the first group and (ii) the prediction mode(s) included in the additional parameter set.

By constituting the reduced set RS as described above, it is possible to generate the reduced set RS which is constituted by (i) the prediction parameter #43 decoded from each of the plurality of sub blocks belonging to the first group and (ii) the prediction mode(s) which tends to be used frequently.

Accordingly, the video encoding device for generating the encoded data #1, including a reduced set derivation section which operates as in the present example, can generate such encoded data #1 that encoding amount of a prediction residual is small. Furthermore, the video decoding device 1 includes the reduced set derivation section 44 which operates as in the present example can decode such encoded data #1 that encoding amount of the prediction residual is small.

(Third Example of Generation of Reduced Set RS)

(c) of FIG. 6 is a flow chart showing a third example of how the reduced set derivation section 44 generates a reduced set RS.

As shown in (c) of FIG. 6, the reduced set derivation section 44 first sets the reduced set RS to be empty, so as to initialize the reduced set RS (Step S301).

Next, the reduced set derivation section 44 adds, to the reduced set RS, the prediction parameter #43 decoded from each of the plurality of sub blocks belonging to the first group (Step S302).

Then, the reduced set derivation section 44 determines whether or not "log, (Np−1)" is an integer (Step S303). Here, "Np" is the number of prediction parameters included in the reduced set RS.

In a case where "$\log_2$ (Np−1)" is an integer (Yes in Step S303), the reduced set derivation section 44 outputs the reduced set RS.

In a case where "$\log_2$ (Np−1)" is not an integer (No in Step S303), the reduced set derivation section 44 adds a predetermined prediction parameter to the reduced set (Step S304), and carries out the process of Step S303 again. Here, the predetermined prediction parameter is, for example, a prediction mode selected from the prediction modes 0 through 8 included in the basic parameter set, which prediction mode (i) is not included in the reduced set RS and (ii) has a smallest index among prediction modes which are not included in the reduced set RS.

As described above, in the intra prediction, the smaller an index designating a prediction mode is, the more frequently the prediction mode designated by the index tends to be used. Accordingly, in the present step, the reduced set derivation section 44 adds, to the reduced set, the prediction mode which tends to be used frequently in the intra prediction.

According to the third example, by carrying out the operations described above, it is possible for the reduced set derivation section 44 to generate the reduced set RS which includes (i) the prediction parameter #43 decoded from each of the plurality of sub blocks belonging to the first group and (ii) the prediction parameters, the number of which is $2^n+1$ (n is an integer).

Under a condition that variable-length coding is carried out with respect to (i) each of the prediction parameters, and simultaneously (ii) the flag indicating whether or not the prediction parameter is the same as an estimate value, generally, compression efficiency in the variable-length coding with respect to the prediction parameters tends to be enhanced in a case where the number of the prediction parameters is $2^n+1$ (n is an integer), as compared with a case where the number of the prediction parameters is not $2^n+1$ (n is an integer).

Accordingly, with the operations described above, the reduced set derivation section 44 can generate the reduced set RS which has high compression efficiency in the variable-length coding. The video encoding device for generating the encoded data #1, including a reduced set derivation section which operates as in the present example, therefore can generate the encoded data #1 which has high compression efficiency. Further, the video decoding device 1 including the reduced set derivation section 44 which operates as in the present example can decode the encoded data #1 which has high compression efficiency.

Furthermore, in a case where the number of the prediction parameters #43 is not $2^n+1$ (n is an integer), the reduced set derivation section 44 can generate the reduced set RS so that the reduced set RS includes the predetermined prediction parameter. Accordingly, it is possible to generate the reduced set RS including the prediction mode which tends to be used frequently.

(Fourth Example of Generation of Reduced Set RS)

In any one of the above examples of generation the respective 3 reduced sets RS shown in (a) through (c) of FIG. 6, the reduced set derivation section 44 adds, to the reduced set RS, all sorts of prediction parameter #43 which are not identical with each other, among all the prediction parameters #43 decoded from the plurality of sub blocks belonging to the first group. Note, however, that the present invention is not limited to this. It is possible to have such an arrangement that not all sorts of prediction parameter #43 but only a part of all sorts of prediction parameter #43, among the prediction parameters decoded from the plurality of sub blocks belonging to the first group, is added to the reduced set RS.

Specifically, it is possible to have an arrangement in which, in a group of parameters decoded from the plurality of sub blocks belonging to the first group, only a prediction parameter(s) which has a higher appearance ratio than a predetermined value is added to the reduced set RS. Here, the appearance ratio is defined, for example, as a value obtained by dividing the number of sub blocks to which the prediction parameter is assigned, among the plurality of sub blocks belonging to the first group, by the number of all the plurality of sub blocks belonging to the first group. For example, the number of all the plurality of sub blocks belonging to the first group is Nf, and the number of sub blocks, to which a prediction parameter Pa is decoded and assigned, is Npa, among the plurality of sub blocks belonging to the first group. In this case, the appearance ratio of the prediction parameter P is defined as Npa/Nf. Further, the appearance ratio can be expressed by a unit of percentage.

Further, the present example is described below more specifically. The following description deals with a case where 8 sub blocks (sub blocks SB1 through SB8) belong to the first group.

For example, (i) a prediction mode 0 is decoded with respect to the sub blocks SB1, SB2, SB3, and SB4, (ii) a prediction mode 1 is decoded with respect to sub blocks SB5 and SB6, (iii) a prediction mode 2 is decoded with respect to the sub block SB7, and (iv) a prediction mode 3 is decoded with respect to the sub block SB8. In a case where the predetermined value is set to be 40%, only the prediction mode 0 having an appearance ratio of 50% is added to the reduced set RS. On the other hand, in a case where the predetermined value is set to be 20%, the prediction mode 0 having an appearance ratio of 50% and the prediction mode 1 having an appearance ratio of 25% are added to the reduced set RS.

Generally, in a case where the number of sub blocks included in the macro block is large, a large number of prediction parameters are included in the reduced set RS. This might make it difficult to reduce the encoding amount effectively.

According to the present example, as to a group of prediction parameters decoded from the plurality of sub blocks belonging to the first group, the reduced set derivation section 44 adds, to the reduction ser RS, only the prediction parameter(s) which has a higher appearance ratio than a predetermined value. Accordingly, it is possible to avoid the above problem that it might become difficult to reduce the encoding amount effectively in a case where the number of sub blocks is large.

As explained in the aforementioned Examples 1 through 4 of generation of the reduced set RS, the reduced set RS can be generated on the basis of the prediction parameters belonging to the first group. More precisely, the reduced set RS can be generated on the basis of at least one of (i) sorts of prediction parameter, among the plurality of prediction parameters belonging to the first group and (ii) an appearance ratio of each of the prediction parameters belonging to the first group.

(Second Prediction Parameter Decoding Section 45)

Figure 7:
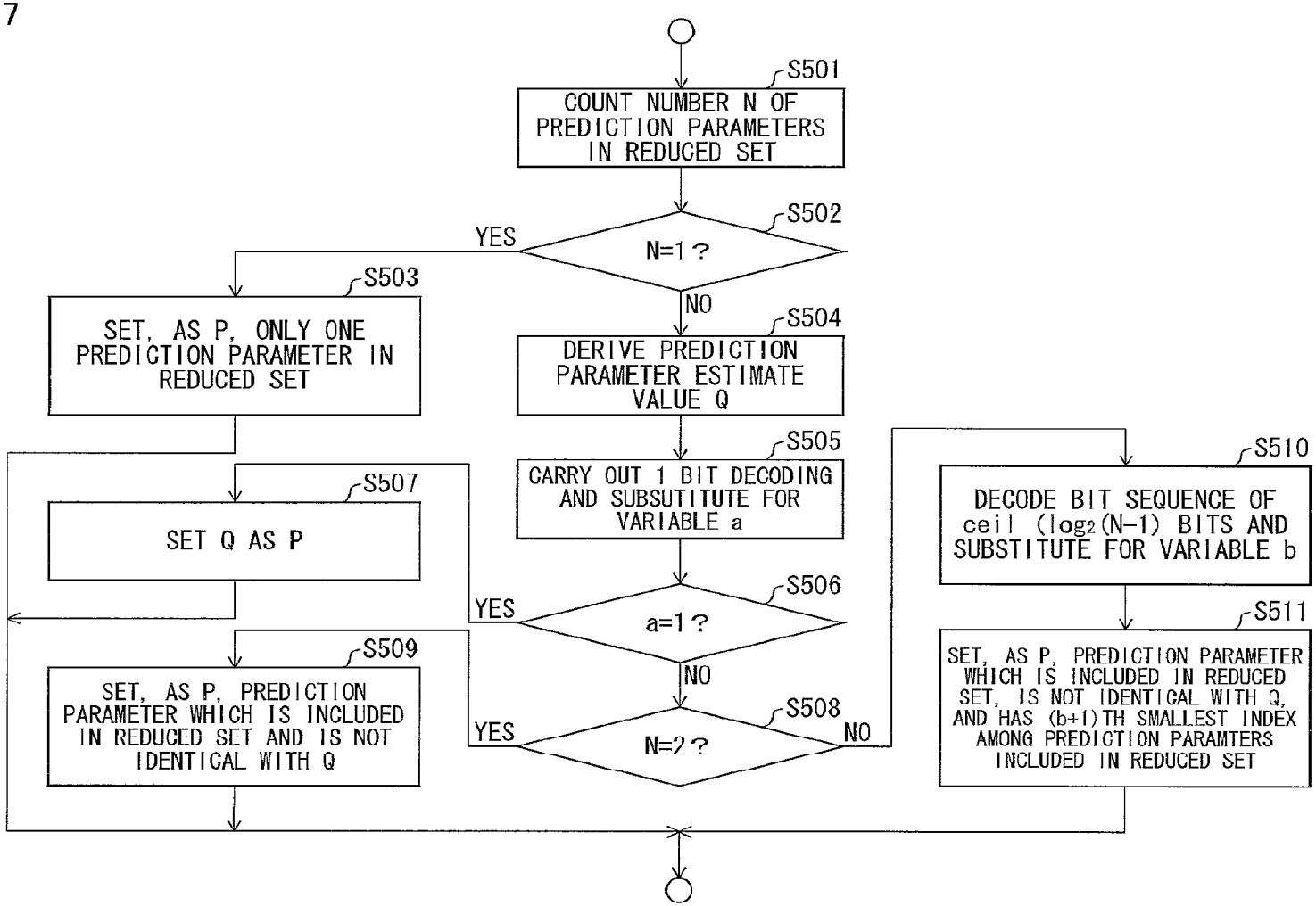
FIG. 7 is a flow chart showing an example of how a decoding process is carried out by a second prediction parameter decoding section included in the prediction parameter decoding section.

Next, the following description deals with how the second prediction parameter decoding section 45 operates, with reference to FIG. 7. The second prediction parameter decoding section 45 decodes a prediction parameter P in the encoded data related to each of the plurality of sub blocks, included in the sub block encoded data #141b, which prediction parameter P is used by the group determination section 41 to predict each of the plurality of sub blocks which are determined as belonging to the second group.

In other words, by referring to information related to the prediction parameter of each of the plurality of sub blocks belonging to the second group, which information is included in the sub block encoded data #141b, the second prediction parameter decoding section 45 decodes the prediction parameter P used in prediction of each of the plurality of sub blocks belonging to the second group.

Further, the prediction parameter P thus decoded is outputted as a prediction parameter #45.

FIG. 7 is a flow chart showing an example of how the second prediction parameter decoding section 45 carries out a decoding process.

As shown in FIG. 7, the second prediction parameter decoding section 45 first counts the number N of prediction parameters included in the reduced set RS (Step S501).

Next, the second prediction parameter decoding section 45 determines whether or not the number N of prediction parameters included in the reduced set RS is 1 (Step S502).

In a case where N is 1 (Yes in Step S502), the second prediction parameter decoding section 45 sets, as the prediction parameter P, the only one prediction parameter included in the reduced set RS (Step S503).

On the other hand, in a case where N is not 1 (No in Step S502), the second prediction parameter decoding section 45 derives a prediction parameter estimate value Q (Step S504). Here, the prediction parameter estimate value Q is a prediction parameter used in prediction of a sub block which is located in a position adjacent to the prediction target sub block on an upper side (or on a left side) with respect to the prediction target sub block. Further, in a case where the sub block located in the position adjacent to the prediction target sub block on the upper side (or on the left side) has not been decoded, the prediction parameter estimate value Q is a prediction parameter used in prediction of a sub block which (i) has been decoded, (ii) is located on the upper side (or on the left side) with respect to the prediction target sub block, and (iii) is closest to the prediction target sub block among such sub blocks.

Next, the second prediction parameter decoding section 45 decodes a flag indicating whether or not a decoding target prediction parameter and the prediction parameter estimate value Q are identical with each other. Then, the second prediction parameter decoding section 45 substitutes a variable "a" with a value thus decoded.

The following description deals with, as an example, a case where the prediction parameter estimate value Q is identical with one of prediction parameters included in the reduced set RS. Further, in the following explanation, (i) a variable "a" whose value is 1 means that the decoding target prediction parameter is identical with the prediction parameter estimate value Q, and (ii) a variable "a" whose value is not 1 means that the decoding target prediction parameter is not identical with the prediction parameter estimate value Q.

Next, the second prediction parameter decoding section 45 determines whether or not a value of the variable "a" is 1 (Step S506).

In a case where a value of the variable "a" is 1 (Yes in Step S506), the second prediction parameter decoding section 45 sets the prediction parameter estimate value Q as the prediction parameter P (Step S507).

On the other hand, in a case where a value of the variable "a" is not 1 (No in Step S506), the second prediction parameter decoding section 45 determines whether or not the number N of prediction parameters included in the reduced set RS is 2 (Step S508).

In a case where N is 2 (Yes in Step S508), the second prediction parameter decoding section 45 sets, as the prediction parameter P, a prediction parameter which (i) is included in the reduced set RS and (ii) is not identical with the prediction parameter estimate value Q (Step S509).

In a case where N is not 2 (No in Step S508), the second prediction parameter decoding section 45 decodes a bit sequence having a length of ceil ($\log_2$ (N−1)) bits, and substitutes a variable "b" with a value thus decoded (Step S510). Here, the "ceil . . . " is a ceiling function having a value of a minimum integer among integers not less than a value in the brackets (this also applies to the following cases). Accordingly, the "ceil . . . " can be expressed as a function which rounds out a value in the brackets to obtain an integer, in a case where the value in the brackets is a positive value.

For example, in a case where N is 5, the second prediction parameter decoding section 45 decodes the bit sequence having a length of "ceil ($\log_2$ (5-1))=2 bits", and substitutes the variable "b" with a value thus decoded. Here, since the length of the bit sequence is 2 bits, a value of the variable "b" is one of 0, 1, 2, and 3, accordingly.

Next, the second prediction parameter decoding section 45 sets, as the prediction parameter P, a prediction parameter which (i) is included in the reduced set RS, (ii) is not identical with the prediction parameter estimate value Q, and (iii) has an index which is the (b+1) th smallest index among such prediction parameters (Step S511).

For example, in a case where a value of the variable "b" is 0, the second prediction parameter decoding section 45 sets, as the prediction parameter P, a prediction parameter which (i) is included in the reduced set RS, (ii) is not identical with the prediction parameter estimate value Q, and (iii) has the smallest index among such prediction parameters.

Note that, in a case where the prediction parameter estimate value Q derived in the process explained in Step S504 is not identical with any one of prediction parameters included in the reduced set RS, the prediction parameter estimate value Q is a prediction parameter which (i) is included in the reduced set RS and (ii) has the smallest index among the prediction parameters included in the reduced set RS.

An example of how the second prediction parameter decoding section 45 carries out a decoding process is as described above. The second prediction parameter decoding section 45 outputs, as the prediction parameter #45, the prediction parameter P decoded by the aforementioned process.

As described above, a video decoding device 1 for decoding encoded data which is obtained in such a manner that (i) a difference between an original image and a prediction image is encoded for each of a plurality of prediction units, and, simultaneously, (ii) selection information is encoded, the selection information indicating which one of a plurality of prediction parameters, each designating how to generate a prediction image, is selected for each of the plurality of prediction units, includes: classification means (group determination section 41) for classifying a plurality of prediction units included in each of a plurality of unit regions constituting the prediction image into a first group and a second group; first selection means (first prediction parameter decoding section 43) for selecting, by referring to first selection information (information which is included in sub block encoded data #141b and is related to a prediction parameter with respect to each of a plurality of sub blocks belonging to the first group) for each of a plurality of prediction units belonging to the first group, among the selection information, a prediction parameter designating how to generate a prediction image for each of the plurality of prediction units belonging to the first group, the first selection means selecting the prediction parameter from a basic set constituted by predetermined prediction parameters; and second selection means (second prediction parameter decoding section 45) for selecting, by referring to second selection information (information which is included in the sub block encoded data #141b and is related to a prediction parameter with respect to each of a plurality of sub blocks belonging to the second group) for each of a plurality of prediction units belonging to the second group, among the selection information, a prediction parameter designating how to generate a prediction image for each of the plurality of prediction parameters belonging to the second group, the second selection means selecting the prediction parameter from a reduced set which (i) includes at least a part of the prediction parameter(s) selected by the first selection means (first prediction parameter decoding section 43) and (ii) is constituted by a prediction parameter(s), the number of which is not more than the number of the predetermined prediction parameters included in the basic set.

(Another Example of Arrangement of Prediction Parameter Decoding Section 144)

In the above explanation, the prediction parameter decoding section 144 has an arrangement in which the reduced set derivation section 44 generates a reduced set RS per macro block. Note, however, that the present invention is not limited to the arrangement.

For example, the prediction parameter decoding section 144 can have an arrangement in which the reduced set derivation section 44 generates a reduced set RS per sub block, and the second prediction parameter decoding section decodes a prediction parameter with respect to a prediction target sub block, on the basis of the reduced set RS generated per sub block.

Figure 8:
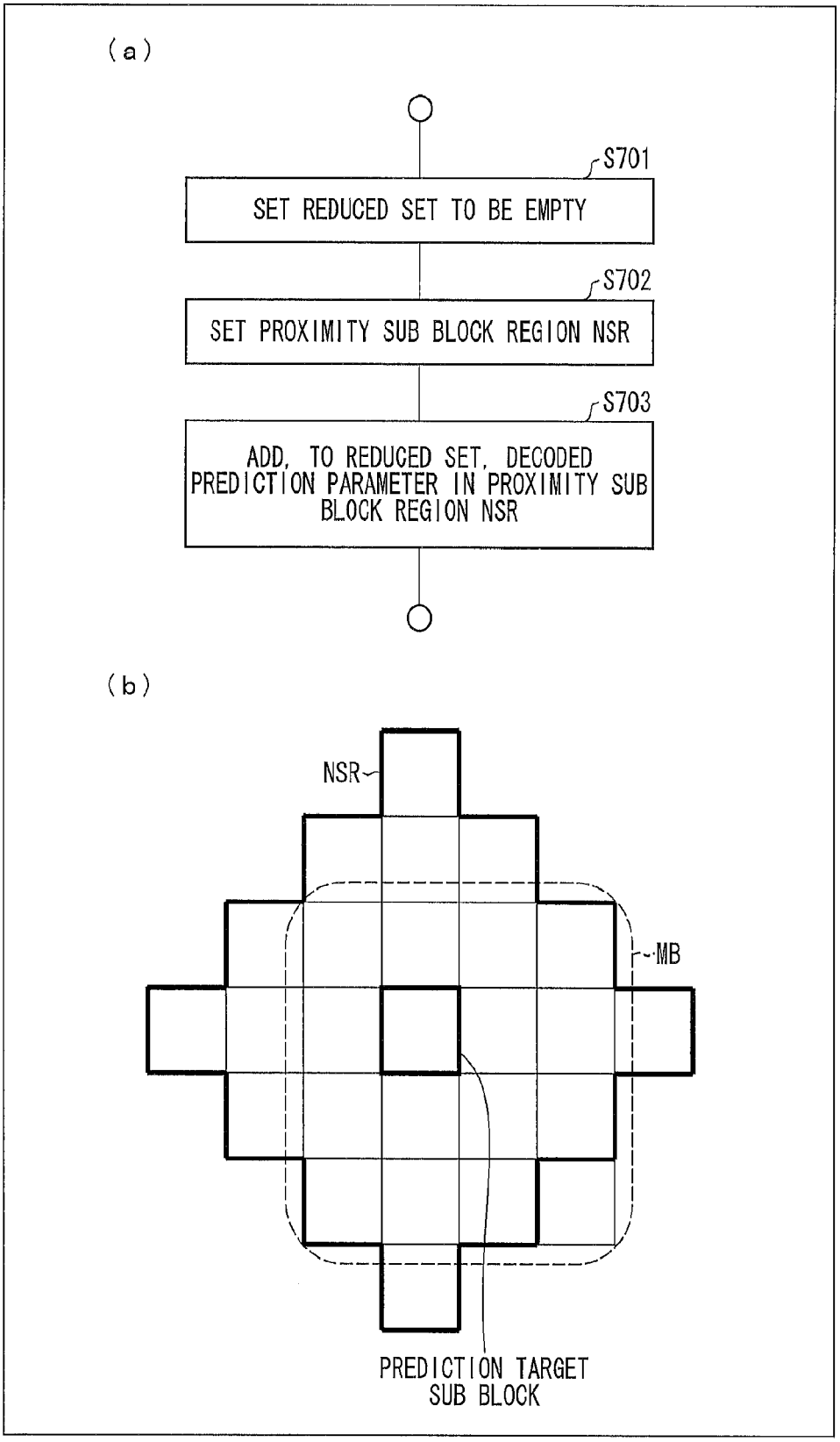
FIG. 8 is an explanatory view showing another example of the arrangement of the prediction parameter decoding section: (a) of FIG. 8 is a flow chart showing an operation of generating a reduced set by the reduced set derivation section; and (b) of FIG. 8 shows an example of a proximity sub block region.

With the arrangement, the reduced set derivation section 44 can generate a reduced set RS by carrying out the following process, as shown in (a) of FIG. 8.

(Step S701)

First, the reduced set derivation section 44 sets the reduced set RS to be empty, so as to initialize the reduced set RS.

(Step S702)

Next, the reduced set derivation section 44 sets, as a proximity sub block region NSR, a region constituted by sub blocks in the vicinity of the prediction target sub block.

(b) of FIG. 8 is a view showing an example of the proximity sub block region NSR. As shown in (b) of FIG. 8, for example, the proximity sub block NSR is constituted by sub blocks in the vicinity of the prediction target sub block, and a distance between the prediction target sub block and the sub blocks in the vicinity of the prediction target sub block is defined as being within 3 sub blocks in terms of a city block distance (unit: sub block). Here, the city block distance is defined as a sum of absolute differences, each of which corresponds to an absolute difference between two coordinates along each direction.

Further, as shown in (b) of FIG. 8, the proximity sub block region NSR can contain sub blocks belonging to a macro block other than the macro block to which the prediction target sub block belongs to.

(Step S703)

Next, the reduced set derivation section 44 adds, to the reduced set RS, a prediction parameter(s) which has been decoded, among prediction parameters with respect to sub blocks included in the proximity sub block region NSR.

Note that, in a case where one prediction parameter is provided for a plurality of sub blocks, among the sub blocks included in the proximity sub block region NSR, the reduced set derivation section 44 adds, for such a plurality of sub blocks, only the one prediction parameter to the reduced set RS.

With the operations described above, the reduced set derivation section 44 can generate the reduced set RS per macro block. Further, the second prediction parameter decoding section 45 can decode the prediction parameter with respect to the prediction target sub block, on the basis of the reduced set RS generated per sub block.

Generally, a prediction parameter with respect to the prediction target sub block has a correlation with a prediction parameter with respect to another sub block located in the vicinity of the prediction target sub block. Accordingly, the prediction parameter(s) included in the reduced set RS generated by the above process is highly likely to include a most appropriate prediction parameter in prediction of a sub block belonging to the second group. Further, the number of prediction parameters included in the reduced set RS generated by the above process is generally smaller than the number of prediction parameters which can be selected for the first group.

Accordingly, the video encoding device for generating the encoded data #1, having an arrangement corresponding to the arrangement described above, can generate, without sacrificing encoding efficiency, the encoded data #1 whose encoding amount is small. Furthermore, the video decoding device 1 having the arrangement described above can decode the encoded data #1 thus generated, whose encoding amount is small.

Note that, in a case where, for the plurality of sub blocks included in the proximity sub block region NSR, there is no prediction parameter which has been decoded, the second prediction parameter decoding section 45 selects a prediction parameter from the basic parameter set, for example.

Moreover, the reduced set 44 of the present example can have an arrangement in which the reduced set RS is derived in substantially the same manner as the process explained in any one of "Example 1 of generation of reduced set RS" to the "Example 4 of generation of reduced set RS". Note, however, that, in that case, the "first group" in each of the "Example 1 of generation of reduced set RS" to the "Example 4 of generation of reduced set RS" corresponds to the "proximity sub block region NSR" in the present example.

Further, in the above explanation, the reduced set RS is used with respect to the second group. Note, however, that the present invention is not limited to this. The aforementioned process can be applied to all the sub blocks in the macro block. That is, it is possible to have an arrangement in which, with respect to each of the sub blocks in the macro block, a prediction parameter is decoded on the basis of the reduced set RS generated per sub block.

The video encoding device for generating the encoded data #1, having an arrangement corresponding to the arrangement described above, can further reduce the encoding amount of the prediction parameters with respect to the sub blocks in the macro block. Accordingly, the video encoding device can generate the encoded data #1 whose encoding amount is further reduced. Moreover, the video decoding device 1 having the arrangement described above decodes the encoded data #1 thus generated.

(Prediction Image Generation Section 145)

The following description deals with how the prediction image generation section 145 generates a prediction image #145.

The prediction image generation section 145 generates, in accordance with a prediction direction (prediction mode) indicated by the prediction parameter #144, a prediction pixel value of each pixel (prediction target pixel) of the prediction image #145 (prediction target sub block) in the following manner, for example. Note that, the following explanation deals with an example where the prediction parameter #144 is one of the prediction modes 0 through 8 shown in FIG. 5.

The prediction image generation section 145 assigns a prediction mode indicated by the prediction parameter #144 to the prediction target pixel, and then, carries out the following operation.

In a case where the prediction mode thus assigned is not the prediction mode 2 (DC prediction), the prediction image generation section 145 sets, as a pixel value of the prediction target pixel, a pixel value of a pixel (hereinafter, referred to as "closest pixel") closest to the prediction target pixel, among pixels which (i) are located on a virtual segment extending from a position of the prediction target pixel in a direction opposite to a prediction direction and (ii) have been decoded. Further, it is possible to set, as the pixel value of the prediction target pixel, a value calculated by use of (i) the pixel value of the closest pixel and (ii) a pixel value(s) of a pixel(s) in the vicinity of the closest pixel.

In a case where (i) the prediction mode thus assigned is the prediction mode 2, and (ii) a sub block adjacent to the prediction target sub block on an upper side with respect to the prediction target sub block (hereinafter, referred to as "upper sub block"), and a sub block adjacent to the prediction target sub block on a left side with respect to the prediction target sub block (hereinafter, referred to as "left sub block") have been decoded, an average value of (a) a pixel value of a pixel located in a lowest sequence of the upper sub block and (b) a pixel value of a pixel in a rightmost sequence of the left sub block is used as the pixel value of the prediction target pixel.

In a case where (i) the prediction mode thus assigned is the prediction mode 2, (ii) the upper sub block has been decoded, and (iii) the left sub block has not been decoded, an average value of (a) the pixel value of the pixel in the lowest sequence of the upper sub block and (b) a pixel value of a pixel in a rightmost sequence in a sub block which is closest to the prediction target sub block on the left side with respect to the prediction target sub block (hereinafter, referred to as "left closest sub block"), is used as the pixel value of the prediction target pixel.

In a case where (i) the prediction mode thus assigned is the prediction mode 2, (ii) the upper sub block has not been decoded, and (iii) the left sub block has been decoded, an average value of (a) a pixel value of a pixel in a lowest sequence of a sub block which is closest to the prediction target sub block on the upper side with respect to the prediction target sub block (hereinafter, referred to as "upper closest sub block"), and (b) the pixel value of the pixel in the rightmost sequence of the left sub block is used as the pixel value of the prediction target pixel.

In a case where (i) the prediction mode thus assigned is the prediction mode 2, and (ii) neither the upper sub block nor the left sub block has been decoded, an average value of (a) the pixel value of the pixel in the lowest sequence of the upper closest sub block and (b) the pixel value of the pixel in the rightmost of the left closest sub block is used as the pixel value of the prediction target pixel.

An example of how the prediction image generation section 145 generates the prediction image #145 is described below more specifically, with reference to FIG. 9. The following description deals with a case where the prediction target sub block is constituted by 4×4 pixels.

FIG. 9 is a view showing (i) each pixel (prediction target pixel) of the prediction target sub block constituted by 4×4 pixels, and (ii) pixels (reference pixels) in the vicinity of the prediction target sub block. As shown in FIG. 9, the prediction target pixels are provided with signs "a" through "p", respectively, and the reference pixels are provided with signs "A" through "M", respectively. A pixel value of a pixel "X" ("X" is one of "a" through "p", or one of "A" through "M") is represented by a sign "X". Further, all the reference pixels "A" through "M" have been decoded.

(Prediction Mode 0)

In a case where the prediction mode thus assigned is the prediction mode 0, the prediction image generation section 145 generates the pixel values "a" through "p" by use of the following formulas.

a,e,i,m=A, b,f,j,n=B, c,g,k,o=C, d,h,l,p=D (Prediction Mode 2)

In a case where the prediction mode thus assigned is the prediction mode 2 (DC prediction), the prediction image generation section 145 generates the pixel values "a" through "p" by use of the following formula.

a~p=ave(A,B,C,D,I,J,K,L)

Here, the "ave ( . . . )" means to obtain an average of elements included in the brackets.

(Prediction Mode 4)

In a case where the prediction mode thus assigned is the prediction mode 4, the prediction image generation section 145 generates the pixel values "a" through "p" by use of the following formula.

d=(B+(C×2)+D+2)>>2, c,h=(A+(B×2)+C+2)>>2, b,g,l=(M+(A×2)+B+2)>>2, a,f,k,p=(I+(M×2)+A+2)>>2, e,j,o=(J+(I×2)+M+2)>>2, i,n=(K+(J×2)+I+2)>>2, m=(L+(K×2)+J+2)>>2

Here, ">>" represents a right shift operation. A value of "x>>s" (x and s are arbitral integers) is equal to a value obtained in such a manner that a fractional part of a value of "x/(2^s) is rounded down.

Further, for a prediction mode other than the prediction modes described above, the prediction image generation section 145 can calculate the pixel values "a" through "p" in the same manner as described above.

<Additional Matters Related to Video Encoding Device>

The video encoding device of the present invention is thus described above. Note, however, that the present invention is not limited to the arrangements described above.

(Additional Matter 1)

For example, the second prediction parameter decoding section 45 can determine, in accordance with a flag included in the encoded data #1, whether or not the reduced set RS is used in decoding the prediction parameter #45.

More specifically, for example, in a case where a value of the flag included in the encoded data #1 is 1, the second prediction parameter decoding section 45 decodes the prediction parameter #45 by use of the reduced set RS. On the other hand, in a case where a value of the flag included in the encoded data #1 is 0, the second prediction parameter decoding section 45 decodes the prediction parameter #45 by use of the basic parameter set in place of the reduced set RS, for example.

With the arrangement, it is possible to reduce an amount of a process for decoding the prediction parameter #45.

(Additional Matter 2)

Further, the second prediction parameter decoding section 45 can determine, in accordance with the number of sub blocks included in the macro block, whether or not the reduced set RS is used in decoding the prediction parameter #45.

More specifically, in a case where the number of sub blocks included in the macro block is not less than 16, the second prediction parameter decoding section 45 decodes the prediction parameter #45 by use of the reduced set RS. On the other hand, in a case where the number of sub blocks included in the macro block is less than 16, the second prediction parameter decoding section 45 decodes the prediction parameter #45 by use of the basic parameter set in place of the reduced set RS, for example.

With the arrangement, it is possible to reduce an amount of the process for decoding the prediction parameter #45.

(Additional Matter 3)

Further, in the above explanations, the basic parameter set is a set of prediction parameters, as shown in FIG. 5. However, the present invention is not limited to this.

Figure 16:
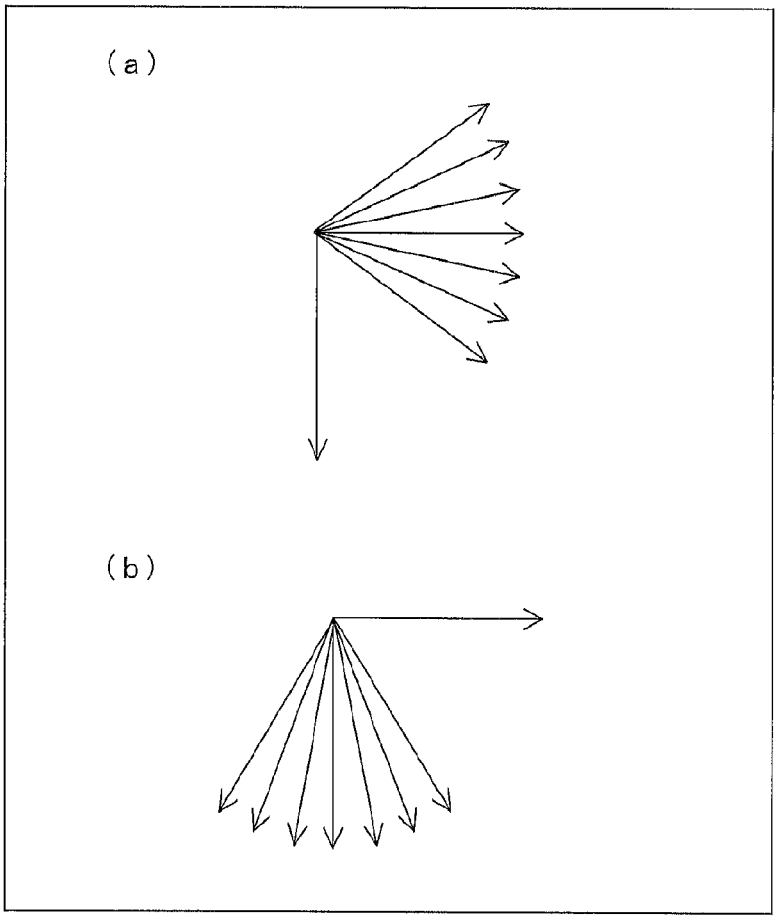
FIG. 16 is a view showing another example of a basic parameter set: (a) of FIG. 16 is a view showing an example of a parameter set whose main direction is a horizontal direction; and (b) of FIG. 16 is a view showing an example of a parameter set whose main direction is a vertical direction.

For example, it is possible to have an arrangement in which the prediction parameter decoding section 144 employs a parameter set whose main direction is a horizontal direction, as shown in (a) of FIG. 16, or a parameter set whose main direction is a vertical direction, as shown in (b) of FIG. 16.

More specifically, for example, in a case where there is an edge in the horizontal direction in the macro block, the prediction parameter decoding section 144 uses, as the basic parameter set, the parameter set whose main direction is the horizontal direction, as shown in (a) of FIG. 16. Meanwhile, in a case where there is an edge in the vertical direction in the macro block, the prediction parameter decoding section 144 uses, as the basic parameter set, the parameter set whose main direction is the vertical direction, as shown in (b) of FIG. 16.

Further, in a case where such a plurality of basic parameter sets are selectively used, and the parameter set shown in (a) of FIG. 16 or the parameter set shown in (b) of FIG. 16 is selected as the basic parameter set, the second prediction parameter decoding section 45 decodes the prediction parameter #45 by use of the reduced set RS. In a case where the parameter set shown in FIG. 5 is selected as the basic parameter set, the second prediction parameter decoding section 45 decodes the prediction parameter #45 by use of the parameter set shown in FIG. 5 as the basic parameter set.

With the arrangement, it is possible to use the reduced set RS in accordance with a characteristic of an image in the macro block.

(Video Encoding Device)

Figure 10:
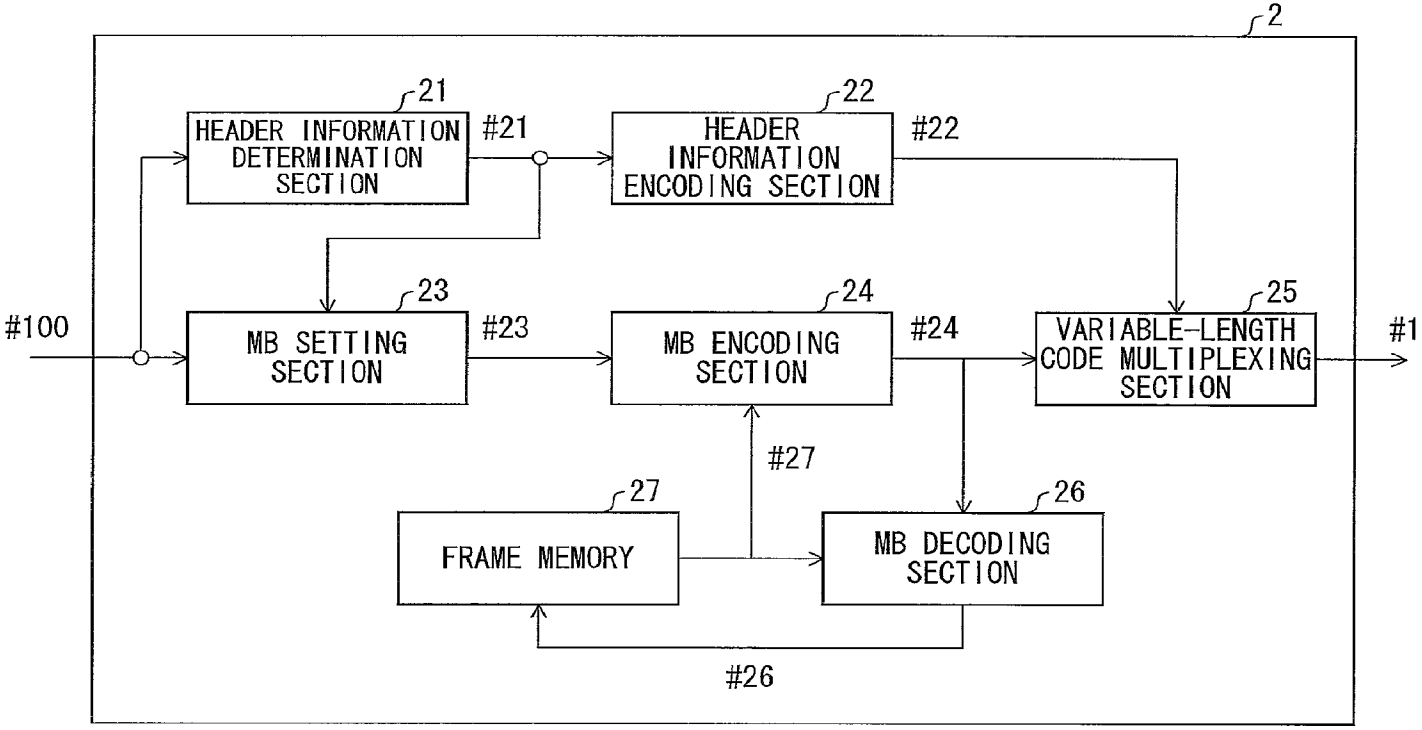
FIG. 10 is a block diagram illustrating an arrangement of a video encoding device in accordance with the embodiment of the present invention.

The following description deals with a video encoding device (image encoding device) 2 of the present embodiment with reference to FIGS. 10 through 14. FIG. 10 is a block diagram illustrating an arrangement of the video encoding device 2. The video encoding device 2 includes a header information determination section 21, a header information encoding section 22, an MB setting section 23, an MB encoding section 24, a variable-length code multiplexing section 25, an MB decoding section 26, and a frame memory 27 (see FIG. 10).

To put it shortly, the video encoding device 2 generates encoded data #1 by encoding an input image #100, and outputs the encoded data #1 thus generated.

The header information determination section 21 determines header information on the basis of the input image #100. The header information thus determined is outputted as header information #21. The header information #21 includes an image size of the input image #100. The header information #21 is supplied to the MB setting section 23, and is also supplied to the header information encoding section 22.

The header information encoding section 22 encodes the header information #21 and outputs the header information #21 thus encoded as encoded header information #22. The encoded header information #22 is supplied to the variable-length code multiplexing section 25.

On the basis of the header information #21, the MB setting section 23 divides the input image #100 into a plurality of macro blocks, and outputs a plurality of macro block images #23 related to the respective plurality of macro blocks. The plurality of macro block images #23 are supplied to the MB encoding section 24 sequentially.

The MB encoding section 24 encodes the plurality of macro block images #23 which are sequentially supplied, so as to generate MB encoded data #24. The MB encoded data #24 thus generated is supplied to the variable-length code multiplexing section 25. An arrangement of the MB encoding section 24 will be described later, and therefore an explanation of the arrangement of the MB encoding section 24 is omitted here.

The variable-length code multiplexing section 25 multiplexes the encoded header information #22 and the MB encoded data #24, so as to generate the encoded data #1. Then, the variable-length code multiplexing section 25 outputs the encoded data #1.

The MB decoding section 26 sequentially decodes the MB encoded data #24 corresponding to each of the plurality of macro blocks thus supplied, so as to generate a decoded image #26 corresponding to each of the plurality of macro blocks. Then, the MB decoding section 26 outputs the decoded image #26. The decoded image #26 is supplied to the frame memory 27.

The decoded image #26 thus supplied is stored in the frame memory 27. When a specific macro block is encoded, decoded images corresponding to, respectively, all macro blocks provided before the macro block in a raster scan order have been stored in the frame memory.

(MB Encoding Section 24)

The following description deals with the MB encoding section 24 with reference to another drawing more specifically.

Figure 11:
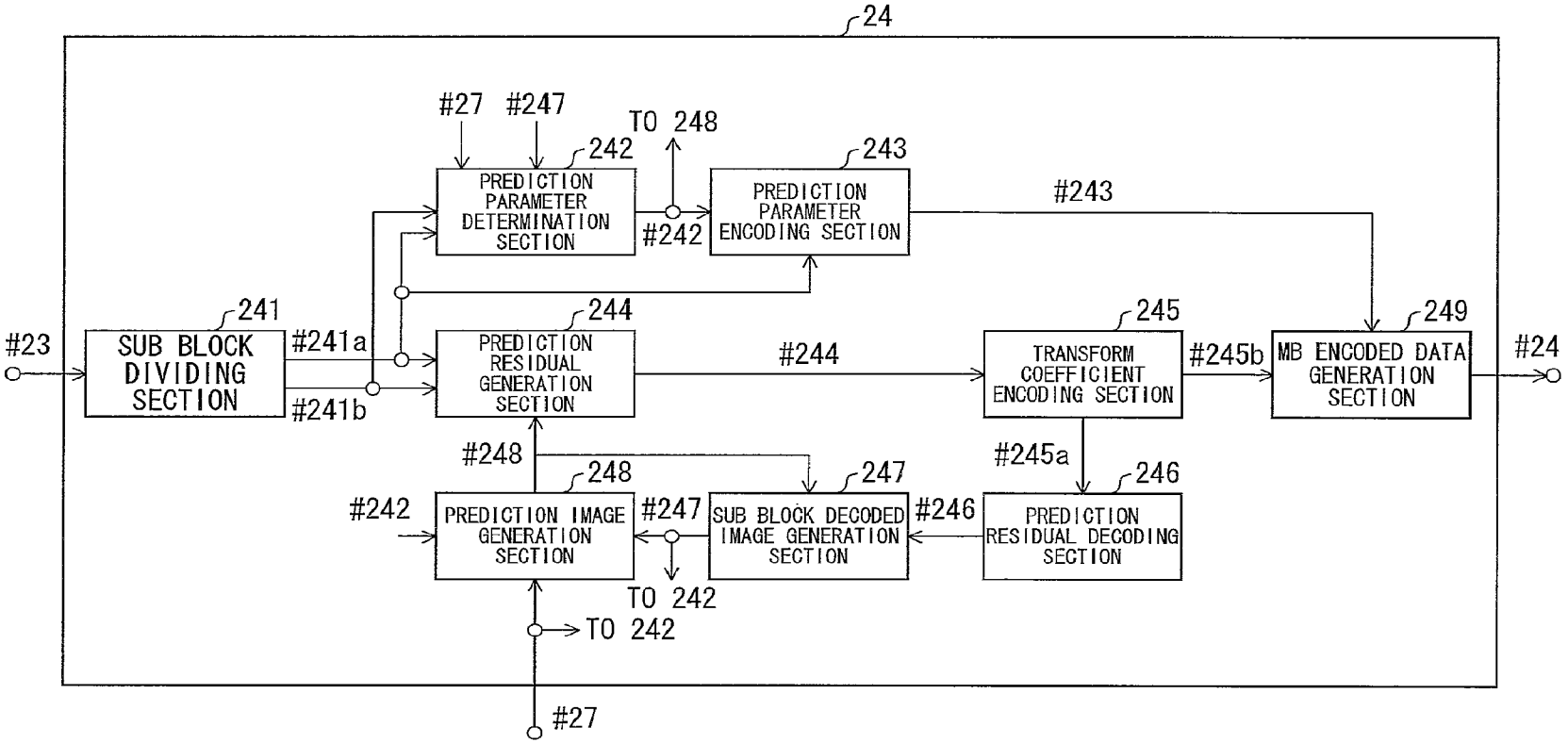
FIG. 11 is a block diagram illustrating an arrangement of an MB encoding section included in the video encoding device in accordance with the embodiment of the present invention.

FIG. 11 is a block diagram illustrating an arrangement of the MB encoding section 24. The MB encoding section 24 includes a sub block dividing section 241, a prediction parameter determination section 242, a prediction parameter encoding section 243, a prediction residual generation section 244, a transform coefficient encoding section 245, a prediction residual decoding section 246, a sub block decoded image generation section 247, a prediction image generation section 248, and an MB encoded data generation section 249 (see FIG. 11).

The sub block dividing section 241 divides the macro block image #23 into a plurality of sub blocks. The sub block dividing section 241 sequentially outputs, in a predetermined order, (i) sub block position information #241a indicating a position of each of the plurality of sub blocks in the macro block, which plurality of sub blocks constitute the macro block, and (ii) a sub block image #241b which is image data related to the sub block indicated by the sub block position information #241a.

Note that it is preferable that the sub block dividing section 241 (i) outputs sub block position information #241a related to each of a plurality of sub blocks belonging to a first group (described later) and a sub block image #241b related to each of the plurality of the sub blocks belonging to the first group, and then (ii) outputs sub block position information #241a related to each of a plurality of sub blocks belonging to a second group (described later) and a sub block image #241b related to each of the plurality of sub blocks belonging to the second group. For example, it is preferable to have an arrangement in which the plurality of sub blocks belonging to the first group are first scanned in the raster scan order, and then, the plurality of sub blocks belonging to the second group are scanned in the raster scan order.

The prediction parameter determination section 242 determines a prediction parameter #242 used to generate a prediction image related to the sub block indicated by the sub block position information #241a, and outputs the prediction parameter #242 thus determined. Further, the prediction parameter encoding section 243 encodes the prediction parameter #242, so as to obtain an encoded prediction parameter #243. Then, the prediction parameter encoding section 243 outputs the encoded prediction parameter #243. An arrangement of the prediction parameter determination section 242 and an arrangement of the prediction parameter encoding section 243 will be described later, and therefore explanations of these arrangements are omitted here.

On the basis of the sub block position information #241a, the prediction residual generation section 244 (i) specifies the sub block which is to be a prediction target, and (ii) generates a prediction residual #244 which is a difference image between the sub block image #241b corresponding to the sub block and a prediction image #248 generated by the prediction image generation section 248.

The transform coefficient encoding section 245 applies, with respect to the prediction residual #244, frequency transform whose size is identical with that of the sub block, so as to generate a transform coefficient of the prediction residual #244.

Further, the transform coefficient encoding section 245 generates a quantization transform coefficient #245a by quantizing the transform coefficient, and then generates a variable-length code by applying a variable-length code method (such as CABAC and CAVLC) with respect to the quantization transform coefficient #245a. After that, the transform coefficient encoding section 245 outputs the variable-length code as encoded data #245b.

The prediction residual decoding section 246 carries out inverse quantization with respect to the quantization transform coefficient #245a, and then, generates a decoded residual #246 by applying inverse transform of the frequency transform (inverse frequency transform) with respect to the quantization transform coefficient #245a. After that, the prediction residual decoding section 246 outputs the decoded residual #246.

Note that the present invention is not limited to the processes carried out by the prediction residual generation section 244, the transform coefficient encoding section 245, and the prediction residual decoding section 246. For example, the transform coefficient encoding section 245 can omit the frequency transform, and can directly quantize the prediction residual.

The sub block decoded image generation section 247 generates a sub block decoded image #247 by adding the prediction image #248 and the decoded residual #246 to each other, and outputs the sub block decoded image #247.

The prediction image generation section 248 generates a prediction image #248 corresponding to the prediction target sub block, on the basis of the prediction parameter #242, a decoded image #27, and the sub block decoded image #247, and outputs the prediction image #248 thus generated. A method identical with the method of generating the prediction image #145 by the prediction image generation section 145 described above can be applied to a specific method of generating the prediction image #248 by the prediction image generation section 248.

The MB encoded data generation section 249 accumulates (i) the encoded data #245b related to each of the plurality of sub blocks and (ii) the encoded prediction parameter #243 related to each of the plurality of sub blocks, so as to cause these to be integrated with each other per macro block. The MB encoded data generation section 249 thus generates MB encoded data #24 which is encoded data whose unit is a macro block, and then, outputs the MB encoded data #24.

The following description deals with the prediction parameter determination section 242 and the prediction parameter encoding section 243 with reference to another drawing.

(Prediction Parameter Determination Section 242)

Figure 12:
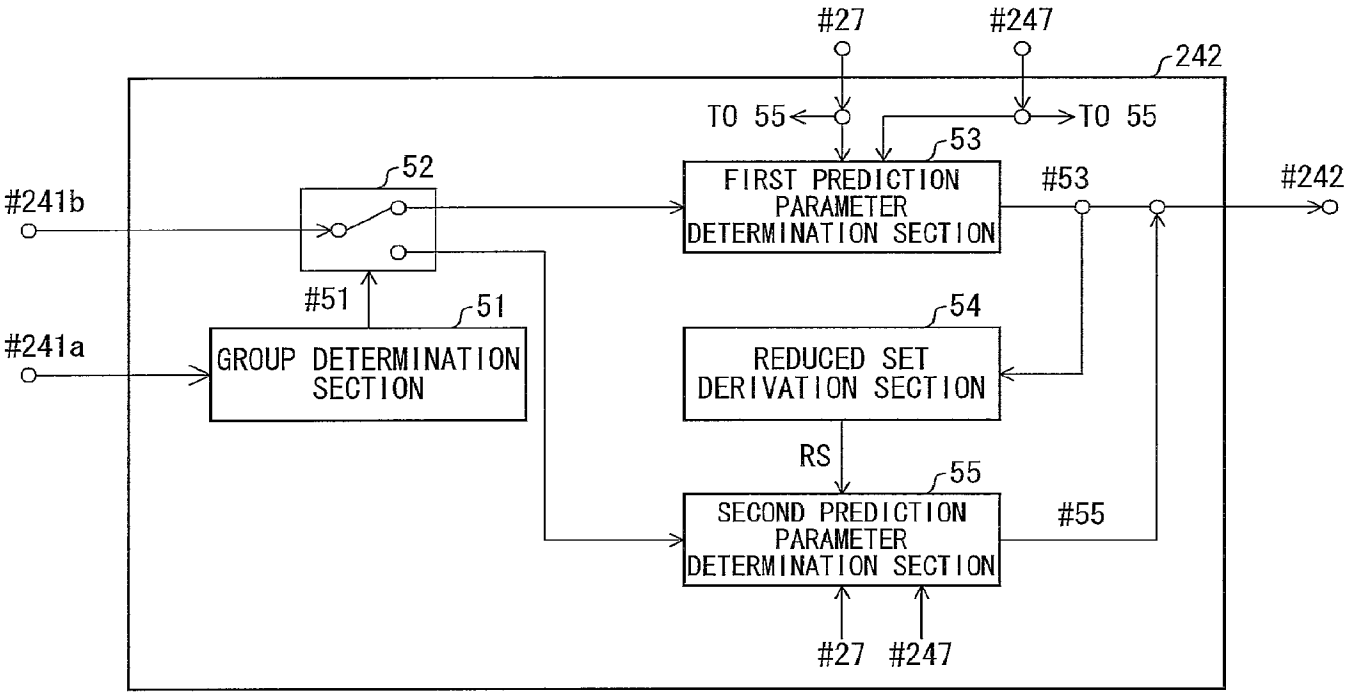
FIG. 12 is a block diagram illustrating an arrangement of a prediction parameter determination section included in the MB encoding section.

FIG. 12 is a block diagram illustrating an arrangement of the prediction parameter determination section 242. The prediction parameter determination section 242 includes a group determination section 51, a switch section 52, a first prediction parameter determination section 53, a reduced set derivation section 54, and a second prediction parameter determination section 55 (See FIG. 12).

The group determination section 51 classifies the sub block indicated by the sub block position information #241a into one of a plurality of groups, and outputs, to the switch section 52, group information #51 indicating a result of the classification.

The group determination section 51 can classify the plurality of sub blocks into the first group and the second group, as explained above with reference to (a) through (f) of FIG. 4, for example.

Further, the group determination section 51 can classify the plurality of sub blocks into a plurality of groups by use of different classification method for the plurality of macro blocks. For example, the group determination section 51 can classify a plurality of sub blocks constituting a macro block MB1 into two groups as shown in (a) and (b) of FIG. 4, while classifying a plurality of sub blocks constituting a macro block MB2, which is different from the macro block MB1, into two groups as shown in (c) and (d) of FIG. 4. With the arrangement in which different classification methods are used for the plurality of macro blocks as described above, it is preferable that the group determination section 51 outputs a flag indicating which classification method has been used. By transmitting the flag to the video decoding device for decoding the encoded data #1, the video decoding device can identify which one of classification methods has been used by the group determination section 51.

On the basis of the group information #51, the switch section 52 transmits, to one of the first prediction parameter determination section 53 and the second prediction parameter determination section 55, the sub block encoded data #241b which is encoded data related to the sub block indicated by the sub block position information #241a.

Specifically, in a case where the group determination section 51 classifies the sub block indicated by the sub block position information #241a into the first group, the switch section 52 transmits the sub block encoded data #241b to the first prediction parameter determination section 53. On the other hand, in a case where the group determination section 51 classifies the sub block indicated by the sub block position information #241a into the second group, the switch section 52 transmits the sub block encoded data #241b to the second prediction parameter determination section 45.

On the basis of the decoded image #27, the sub block decoded image #247, and the sub block encoded data #241b, the first prediction parameter determination section 53 determines (selects) a prediction parameter #53 used to generate a prediction image related to each of the plurality of sub blocks belonging to the first group. Then, the first prediction parameter determination section 53 outputs the prediction parameter #53. Further, the prediction parameter #53 is also supplied to the reduced set derivation section 54.

In a case where, for example, the prediction parameter is an intra prediction mode defined in the H.264/MPEG-4 AVC standard, the first prediction parameter determination section 53 (i) selects, with respect to each of the plurality of sub blocks belonging to the first group, one of prediction modes in the basic parameter set which has been described above with reference to FIG. 5, and (ii) outputs the prediction mode thus selected.

Note that the present invention is not limited to the specific method of determining the specific prediction parameter #53, carried out by the first prediction parameter determination section 53. For example, the first prediction parameter determination section 53 can determine the prediction parameter #53 with respect to each of the plurality of sub blocks belonging to the first group so that a difference between the prediction image of the sub block and the input image #100 becomes smallest. For example, in a case where, with respect to a sub block SB1 belonging to the first group, a difference between a prediction image generated by use of the prediction mode 1 in the basic parameter set and the input image #100 becomes smallest, as compared with a case where another prediction mode in the basic parameter set is used, the first prediction parameter determination section 53 selects the prediction mode 1 with respect to the sub block SB1. In a case where, with respect to a sub block SB2 belonging to the first group, a difference between a prediction image generated by use of the prediction mode 2 in the basic parameter set and the input image #100 becomes smallest, as compared with a case where another prediction mode in the basic parameter set is used, the first prediction parameter determination section 53 selects the prediction mode 2 with respect to the sub block SB2.

Figure 13:
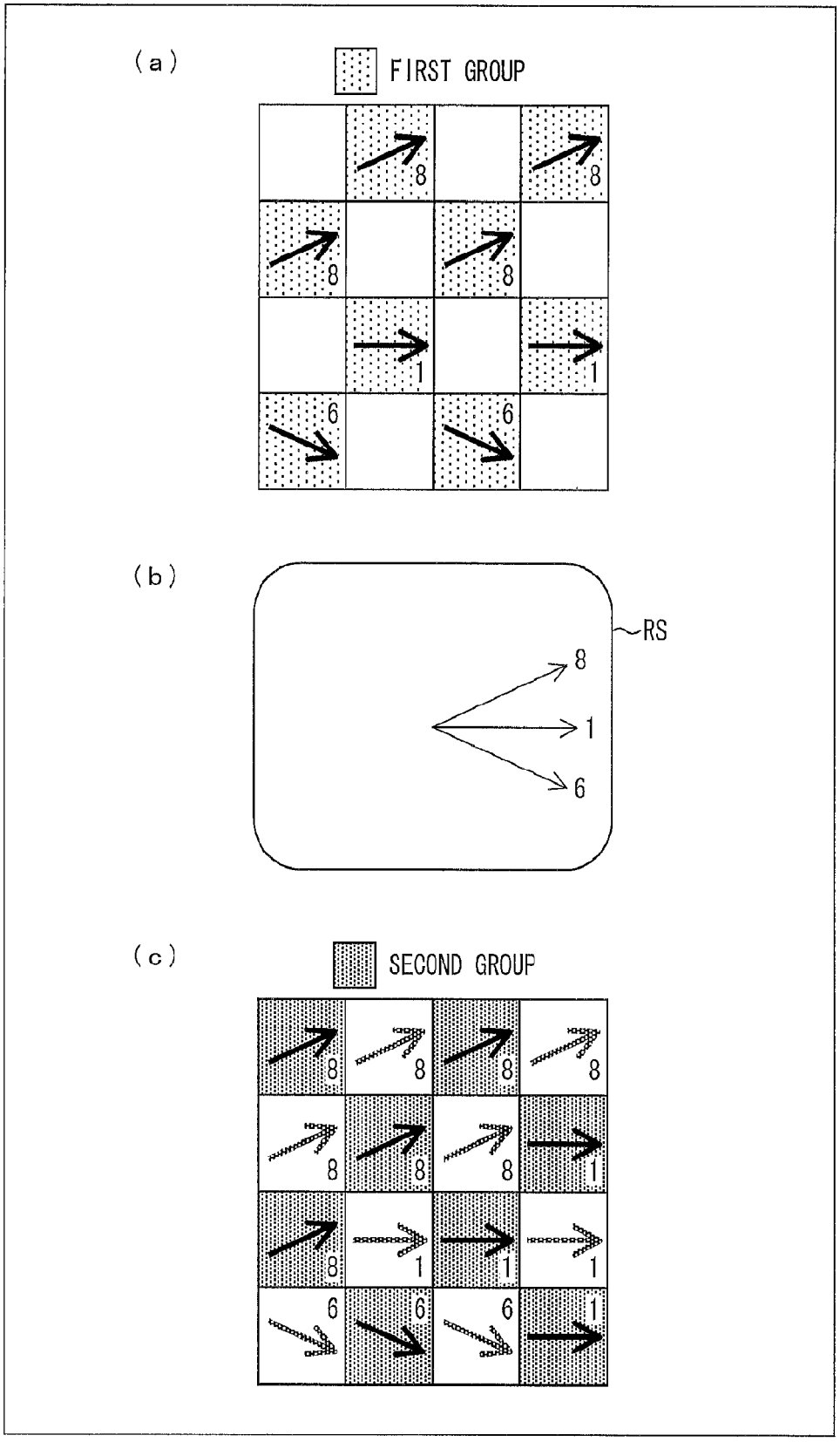
FIG. 13 is an explanatory view showing how the prediction parameter determination section included in the MB encoding section operates: (a) of FIG. 13 is a view showing an example of prediction modes which are selected by a first prediction parameter determination section with respect to a plurality of sub blocks belonging to a first group, among a plurality of sub blocks constituting a macro block MB; (b) of FIG. 13 is a view showing an example of a reduced set which is generated by a reduced set derivation section in a case where the prediction modes shown in (a) of FIG. 13 are supplied as prediction parameters; and (c) of FIG. 13 is a view showing an example of prediction modes which are selected from the reduced set shown in (b) of FIG. 13, with respect to a plurality of sub blocks belonging to a second group, by a second prediction parameter determination section.

(a) of FIG. 13 is a view showing an example of a prediction mode which is selected by the first prediction parameter determination section 53 with respect to each of the plurality of sub blocks belonging to the first group, among the plurality of sub blocks constituting the macro block MB. According to the example shown in (a) of FIG. 13, the first prediction parameter determination section 53 selects, with respect to each of the plurality of sub blocks belonging to the first group, one of the prediction mode 1, the prediction mode 6, and the prediction mode 8. In the present example, each of the prediction modes 1, 6, and 8 is supplied to the reduced set derivation section 54 as the prediction parameter #53.

With the operations described above, the reduced set derivation section 54 is supplied with the prediction parameter #53 related to each of the plurality of sub blocks belonging to the first group.

An arrangement of the reduced set derivation section 54 is the same as that of the reduced set derivation section 44 described above. That is, the reduced set derivation section 54 generates the reduced set RS by use of the prediction parameter #53. A method of generating the reduced set RS by the reduced set derivation section 54 is the same as the method of generating the reduced set RS by the reduced set derivation section 44 described above.

Note that, in a case where a plurality of generation methods are employed by the reduced set derivation section 54 selectively, it is preferable that the reduced set derivation section 54 outputs a flag indicating which one of the plurality of generation methods has been selected. By transmitting the flag to the video decoding device for decoding the encoded data #1, it becomes possible for the video decoding device to identify which one of the plurality of generation methods has been employed by the reduced set derivation section 54.

(b) of FIG. 13 is a view showing an example of the reduced set RS, which is generated by the reduced set derivation section 54 in a case where each of the prediction modes shown in (a) of FIG. 13 is supplied as the prediction parameter #53. According to the present example, the reduced set RS is constituted by a prediction mode 1, a prediction mode 8, and a prediction mode 6 (see (b) of FIG. 13).

The second prediction parameter determination section 55 selects, from among prediction parameters included in the reduced set RS, a prediction parameter #55 used to generate a prediction image related to each of the plurality of sub blocks belonging to the second group. Then, the second prediction parameter determination section 55 outputs the prediction parameter #55.

The present invention is not limited to a specific method of determining the prediction parameter #55 by the second prediction parameter determination section 55. For example, the second prediction parameter determination section 55 selects, from among the prediction parameters included in the reduced set RS with respect to each of the plurality of sub blocks belonging to the second group, such a prediction parameter #55 that a prediction image of the sub block can be generated in the most appropriate manner.

(c) of FIG. 13 is a view showing an example of a prediction mode, which is selected from among the prediction modes included in the reduced set RS shown in (b) of FIG. 13 by the second prediction parameter determination section 55 with respect to each of the plurality of sub blocks belonging to the second group, among the plurality of sub blocks constituting the macro block MB. As shown in (c) of FIG. 13, one of the prediction modes 1, 6, and 8, included in the reduced set RS shown in (b) of FIG. 13, is selected with respect to each of the plurality of sub blocks belonging to the second block.

Generally, optimum prediction parameters with respect to a plurality of sub blocks constituting a macro block have a correlation with each other. Accordingly, a prediction parameter selected with respect to each of the plurality of sub blocks belonging to the first group is highly likely to be an optimum prediction parameter with respect to each of the plurality of sub blocks belonging to the second group.

Further, as described above, the second prediction parameter determination section 55 selects, from among the prediction parameters included in the reduced set RS, the prediction parameter #55 with respect to each of the plurality of sub blocks belonging to the second group. Accordingly, it is possible to reduce an encoding amount of the prediction parameters #55, as compared with a case where the reduced set RS is not used.

For example, as described later, in a case where a prediction mode and a flag indicating whether or not the prediction mode is identical with an estimate value are simultaneously encoded, the three prediction modes included in the reduced set RS shown in (b) of FIG. 13 can be encoded with an encoding amount of ceil ($\log_2$ (3−1))=1 bit. Meanwhile, in a case where the second prediction parameter determination section 55 selects a prediction parameter from the basic parameter set constituted by 9 prediction modes, without using the reduced set RS, a necessary encoding amount becomes ceil ($\log_2$ (9−1))=3 bits. Furthermore, in the above example, the second group is constituted by 8 sub blocks. Accordingly, as compared with the case where the reduced set RS is not used, it is possible to reduce, per macro block, the encoding amount by 3×8−1×8=16 bits, by using the reduced set RS.

Generally, in a case where a prediction parameter and the flag indicating whether or not the prediction parameter is identical with the estimate value are simultaneously encoded, it is possible to reduce, per macro block, the encoding amount by Ngs×(ceil ($\log_2$ (Nfs−1))−ceil ($\log_2$ (Nrs−1))) bits (where: Nfs is the number of prediction parameters which can be selected with respect to each of the plurality of sub blocks belonging to the first group; Nrs is the number of prediction parameters included in the reduced set RS; and Ngs is the number of sub blocks included in the second group) by use of the reduced set RS.

As described above, by using the reduced set RS, it is possible to reduce the encoding amount necessary to encode a prediction parameter, without sacrificing encoding efficiency.

(Another Example of Arrangement of Prediction Parameter Determination Section 242)

In the above explanation as to the prediction parameter determination section 242, the reduced set derivation section 54 generates the reduced set RS per macro block. Note, however, that the present invention is not limited to the arrangement.

That is, the prediction parameter determination section 242 can have such an arrangement that (i) the reduced set derivation section 54 generates the reduced set RS per sub block, and (ii) the second prediction parameter determination section 55 determines a prediction parameter with respect to a prediction target sub block on the basis of the reduced set RS generated per sub block.

With the arrangement, the reduced set derivation section 54 carries out the same operations as those of the reduced set derivation section 44, explained in the above (Step S701) through (Step S703) of (Another example of arrangement of reduction parameter decoding section 144) described above. Note, however, that the decoded prediction parameter in the above (Step S701) through (Step S703) of (Another example of arrangement of prediction parameter decoding section 144) corresponds to the encoded prediction parameter in the present example.

With the arrangement, the reduced set derivation section 54 can generate the reduced set RS per sub block. Further, the second prediction parameter determination section 55 can determine the prediction parameter with respect to the prediction target sub block, on the basis of the reduced set RS generated per sub block.

Generally, a prediction parameter with respect to the prediction target parameter has a correlation with a prediction parameter with respect to another sub block located in the vicinity of the prediction target sub block. Accordingly, a prediction parameter included in the reduced set RS generated by the operations described above is highly likely to be an optimum prediction parameter in prediction of a sub block belonging to the second group. Further, the number of prediction parameters included in the reduced set RS generated by the operations described above is generally smaller than the number of prediction parameters which can be selected with respect to sub blocks included in the first group.

Accordingly, the video decoding device 1 having the arrangement described above can generate encoded data #1 whose encoding amount is small, without sacrificing encoding efficiency.

Note that, in a case where there is no encoded prediction parameter with respect to a plurality of sub blocks included in the proximity sub block region NSR, the second prediction parameter determination section 55 selects a prediction parameter from the basic parameter set, for example.

Furthermore, the reduction set derivation section 54 of the present example can derive the reduced set RS by carrying out operations substantially similar to the operations described in the above (Example 1 of generation of reduced set RS) through (Example 4 of generation of reduced set RS). In this case, however, the "first group" described in the above (Example 1 of generation of reduced set RS) through (Example 4 of generation of reduced set RS) corresponds to the "proximity sub block region NSR" in the present example.

Moreover, in the above explanation, the reduced set RS is used with respect to the second group. Note, however, that the present invention is not limited to this. It is possible to apply the aforementioned operations to all the sub blocks in the macro block. That is, it is possible to have an arrangement in which, on the basis of a reduced set RS generated per sub block, a prediction parameter is determined with respect to each of the sub blocks in the macro block.

With the arrangement, it is possible to reduce an encoding amount of prediction parameters with respect to the sub blocks in the macro block. Accordingly, the video encoding device 1 having the arrangement described above can generate encoded data #1 whose encoding amount is further reduced.

(Prediction Parameter Encoding Section 243)

Figure 14:
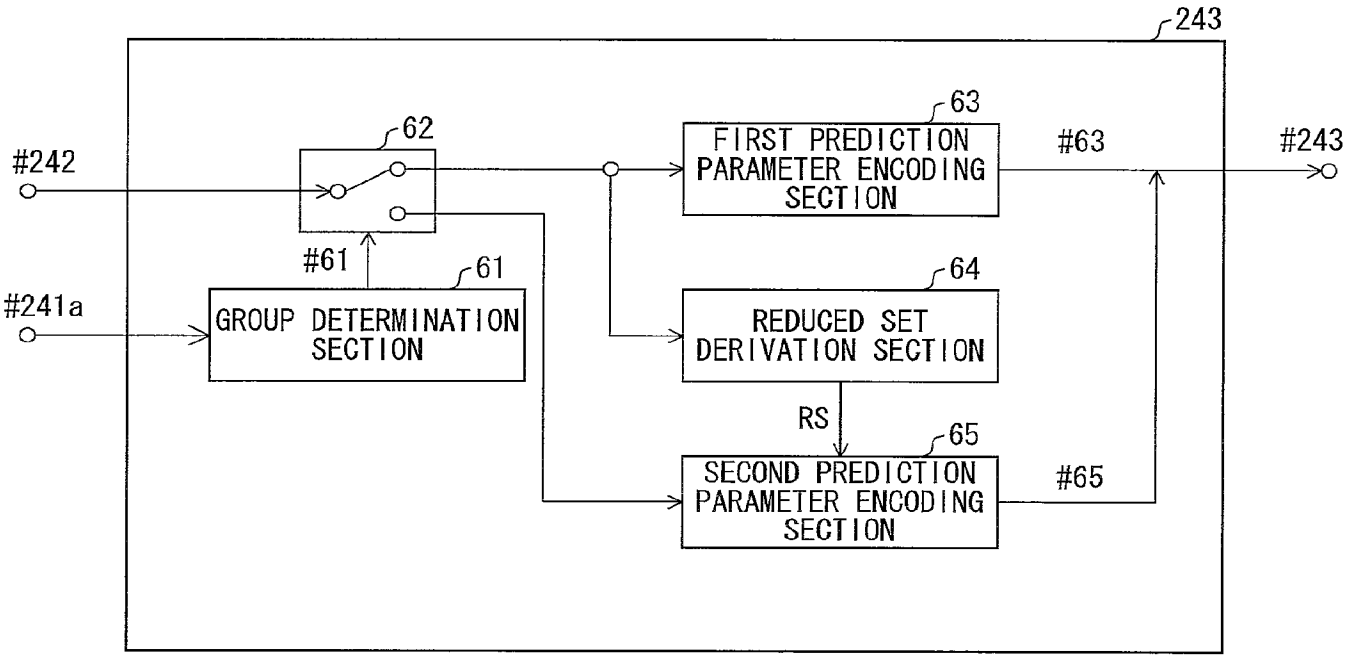
FIG. 14 is a block diagram illustrating an arrangement of a prediction parameter encoding section included in the MB encoding section.

Next, the following description deals with the prediction parameter encoding section 243 with reference to FIG. 14. FIG. 14 is a block diagram illustrating an arrangement of the prediction parameter encoding section 243. The prediction parameter encoding section 243 includes a group determination section 61, a switch section 62, a first prediction parameter encoding section 63, a reduced set derivation section 64, a second prediction parameter encoding section 65 (see FIG. 14).

The group determination section 61 has an arrangement which is substantially similar to that of the group determination section 51 described above. That is, the group determination section 61 (i) classifies a sub block indicated by sub block position information #241a into one of a plurality of predetermined groups, and (ii) outputs, to the switch section 62, group information #61 indicating a result of the classification. Note that, the group determination section 61 employs the same classification method as the classification method used by the group determination section 51, so as to classify each sub block into a corresponding one of the plurality of predetermined groups.

On the basis of the group information #61, the switch section 62 transmits a prediction parameter #242 related to a sub block indicated by the sub block position information #241a to one of the first prediction parameter encoding section 63 and the second prediction parameter encoding section 65.

Specifically, in a case where the group determination section 61 classifies the sub block indicated by the sub block position information #241a into the first group, the switching section 62 transmits the prediction parameter #242 to both the first prediction parameter encoding section 63 and the reduced set derivation section 64. On the other hand, in a case where the group determination section 61 classifies the sub block indicated by the sub block position information #241a into the second group, the switching section 62 transmits the prediction parameter #242 to the second prediction parameter encoding section 65.

The first prediction parameter encoding section 63 encodes the prediction parameter #242 related to each of the plurality of sub blocks belonging to the first group, so as to generate an encoded prediction parameter #63. Then, the first prediction parameter encoding section 63 outputs the encoded prediction parameter #63.

Specifically, the first prediction parameter encoding section 63 first sets, as an estimate value with respect to each of the plurality of sub blocks belonging to the first group, a prediction parameter selected with respect to another sub block located in the vicinity of the sub block.

Next, the first prediction parameter encoding section 63 encodes a flag indicating whether or not the prediction parameter selected with respect to the sub block is different from the estimate value. Further, in a case where the prediction parameter selected with respect to the sub block is different from the estimate value, the first prediction parameter encoding section 63 encodes the prediction parameter.

Here, in a case where the prediction parameter with respect to each of the plurality of sub blocks belonging to the first group is selected from the basic parameter set, the prediction parameter can be expressed by a code of 1 bit or a code of 4 bits (including the flag).

As described above, by carrying out encoding by use of the estimate value, it is possible to enhance compressibility in encoding the prediction parameter #242 related to each of the plurality of sub blocks belonging to the first group.

Note that the first prediction parameter encoding section 63 can encode the prediction parameter #242 itself, related to each of the plurality of sub blocks belonging to the first group.

The reduced set derivation section 64 generates the reduced set RS by use of the prediction parameter #242 related to each of the plurality of sub blocks belonging to the first group. A method of generating the reduced set RS by the reduced set derivation section 64 is the same as the method of generating the reduced set RS by the reduced set derivation section 44 described above, and therefore explanation of the method of generating the reduced set RS is omitted here.

The second prediction parameter encoding section 65 encodes a prediction parameter which is included in the reduced set RS, that is, the prediction parameter selected with respect to each of the plurality of sub blocks belonging to the second group, so as to generate an encoded prediction parameter #65. Then, the second prediction parameter encoding section 65 outputs the encoded prediction parameter #65.

Specifically, the second prediction parameter encoding section 65 first sets, as an estimate value with respect to each of the plurality of sub blocks belonging to the second block, a prediction parameter selected with respect to another sub block located in the vicinity of the sub block.

In a case where the number Nrs of prediction parameters included in the reduced set RS is 1, the second prediction parameter encoding section 65 does not encode any prediction parameter, and finishes an encoding process of a second prediction parameter.

Next, the second prediction parameter encoding section 65 encodes a flag indicating whether or not the prediction parameter selected with respect to the sub block is different from the estimate value. Further, in a case where the prediction parameter selected with respect to the sub block is different from the estimate value, the second prediction parameter encoding section 65 encodes the prediction parameter.

Here, in a case where Nrs is 2, the second prediction parameter encoding section 65 finishes the encoding process of the second prediction parameter.

In a case where Nrs is not 2, the prediction parameter included in the reductions set can be expressed by a code of cell ($\log_2$ (Nrs−1)) bits.

Further, the number Nrs of prediction parameters included in the reduced set RS is generally smaller than the number of prediction parameters which can be selected with respect to the plurality of sub blocks belonging to the first group.

Accordingly, by employing the reduced set RS, it is possible to encode a prediction parameter selected with respect to each of the plurality of sub blocks belonging to the second group, while having a reduction in encoding amount.

Further, as described above, by carrying out encoding by use of an estimate value, it is possible to enhance compressibility in encoding the prediction parameter #242 related to each of the plurality of sub blocks belonging to the second group.

Note that it is possible to have an arrangement in which the second prediction parameter encoding section 65 encodes the prediction parameter itself, selected with respect to each of the plurality of sub blocks belonging to the second group.

<Additional Matters Related to Video Encoding Device>

The video encoding device 2 of the present invention is thus explained above. Note, however, that the present invention is not limited to the arrangements described above.

(Additional Matter 1')

For example, it is possible to have an arrangement in which the second prediction parameter determination section (i) finds a spatial correlation between prediction parameters in the macro block, and (ii), in a case where the spatial correlation thus found is small, determines the prediction parameter #55 without using the reduced set RS. Further, it is preferable to have an arrangement in which, in a case where the second prediction parameter determination section 55 determines the prediction parameter #55 without using the reduced set RS, the video encoding device 2 (i) encodes a flag indicating that the reduced set RS is not used, and (ii) transmits the flag thus encoded to the video decoding device.

With the arrangement, it is possible to determine the prediction parameter #55 without using the reduced set RS, in a case where the spatial correlation between the prediction parameters is small. It is therefore possible to suppress an amount of a process for determining a prediction parameter.

(Additional Matter 2')

Further, it is possible to have an arrangement in which the second prediction parameter determination section 55 determines, in accordance with the number of sub blocks included in the macro block, whether or not the reduced set RS is used to determine the prediction parameter #55.

More specifically, in a case where the number of sub blocks included in the macro block is not less than 16, the second prediction parameter determination section 55 determines the prediction parameter #55 by use of the reduced set RS. On the other hand, in a case where the number of sub blocks included in the macro block is less than 16, the second prediction parameter determination section 55 determines the prediction parameter #45 by use of the basic parameter set in place of the reduced set RS.

With the arrangement, it is possible to determine the prediction parameter #55 without using the reduced set RS, in a case where the spatial correlation between the prediction parameters is small. It is therefore possible to suppress an amount of a process for determining a prediction parameter.

(Additional Matter 3')

Moreover, it is possible to have an arrangement in which, in accordance with a characteristic of an image in the macro block, the prediction parameter determination section 242 employs, as the basic parameter set, one of (i) a parameter set whose main direction is a horizontal direction (as shown in (a) of FIG. 16) and (ii) a parameter set whose main direction is a vertical direction (as shown in (b) of FIG. 16).

For example, the prediction parameter determination section 242 can employ, as the basic parameter set, the parameter set whose main direction is the horizontal direction (as shown in (a) of FIG. 16), in a case where there is a horizontal edge in the macro block. On the other hand, the prediction parameter determination section 242 can employ, as the basic parameter set, the parameter set whose main direction is the vertical direction (as shown in (b) of FIG. 16), in a case where there is a vertical edge in the macro block, for example.

Further, it is possible to have an arrangement in which (I), in a case where (i) a plurality of basic parameter sets are used selectively and (ii) the parameter set shown in (a) of FIG. 16 or the parameter set shown in (b) of FIG. 16 is selected as the basic parameter set, the second prediction parameter determination section 55 determines the prediction parameter #55 by use of the reduced set RS, and (II), in a case where the parameter set shown in FIG. 5 is selected as the basic parameter set, the second prediction parameter determination section 55 decodes the prediction parameter set #55 by use of the basic parameter set in place of the reduced set RS.

With the arrangement, it is possible to determine whether to use the reduced set RS in accordance with a characteristic of an image in the macro block. It is therefore possible to reduce effectively an encoding amount of prediction parameters.

(Data Structure of Encoded Data #1)

Figure 15:
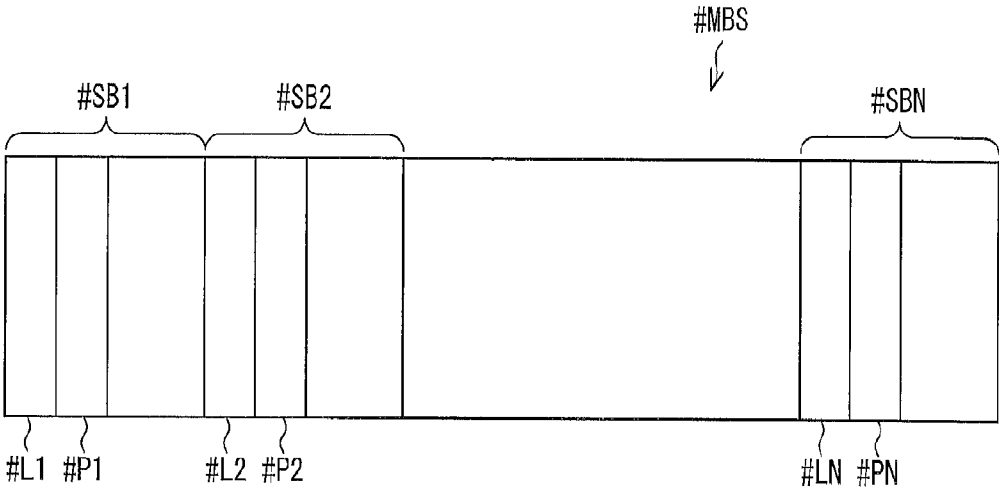
FIG. 15 is a view showing a bit stream structure for each macro block of encoded data which (i) is generated by the video encoding device in accordance with the embodiment of the present invention and (ii) is referred to by the video decoding device in accordance with the embodiment of the present invention.

The following description deals with a data structure of encoded data #1 generated by the video encoding device 2, with reference to FIG. 15.

FIG. 15 is a view showing a bit stream structure of a bit stream #MBS for each of a plurality of macro blocks of the encoded data #1. As shown in FIG. 15, the bit stream #MBS includes sub block information #SB1 through #SBN (here, N is the number of sub blocks in the macro block), which is information related to sub blocks SB1 through SBN (here, N is the number of sub blocks in the macro block) included in the macro block.

Further, as shown in FIG. 15, each sub block information #SBn ($1 \leq n \leq N$) includes (i) sub block position information #Ln which is information indicating a position of a sub block SBn in the macro block, and (ii) prediction parameter information #Pn indicating a prediction parameter associated with the sub block SBn.

The sub block position information #Ln is referred to in the video decoding device for decoding the encoded data #1, so that the position of the sub block SBn in the macro block is specified. Particularly, in the video decoding device 1 described above, the sub block position information #Ln is information which is referred to, so that the sub block SBn is classified into a group.

The prediction parameter information #Pn is information for specifying, in the video decoding device for decoding the encoded data #1, a prediction parameter associated with the sub block SBn. Particularly, in the video decoding device 1 described above, the prediction parameter information #Pn is information indicating a prediction parameter among prediction parameters which can be selected with respect to a group to which the sub block SBn belongs.

For example, in a case where the sub block SBn belongs to the first group, and the basic parameter set is a prediction parameter set constituted by prediction parameters which can be selected with respect to the first group, the prediction parameter information #Pn is information indicating one of the prediction modes 0 through 8 included in the basic parameter set.

Further, in a case where the sub block SBn belongs to the second group, the prediction parameter information #Pn is information indicating a prediction parameter among prediction parameters included in the reduced set RS.

Furthermore, in a case where the encoded data #1 is data generated by encoding, simultaneously, a prediction mode and a flag indicating whether or not the prediction parameter is identical with an estimate value, the prediction parameter #Pn can be represented by a code of ceil ($\log_2$ (N−1)) bits. Here, N is the number of prediction parameters which can be selected with respect to the group to which the sub block SBn belongs.

Generally, the number of prediction parameters included in the reduced set RS is smaller than the number of prediction parameters which can be selected with respect to the first group. Accordingly, an encoding amount of the prediction parameters included in the encoded data #1 is small in a case where the reduced set RS is used, as compared with a case where the reduced set RS is not used.

Specifically, in a case where the encoded data #1 is data generated by encoding, simultaneously, a prediction mode and a flag indicating whether or not the prediction mode is identical with an estimate value, an encoding amount of the prediction parameter information #Pn is smaller by ceil ($\log_2$ (Nfs−1))−ceil ($\log_2$ (Nrs−1)) bits, as compared with a case where the reduced set RS is not used. Here, Nfs is the number of prediction parameters which can be selected with respect to each of the plurality of sub blocks belonging to the first group, and Nrs is the number of prediction parameters included in the reduced set RS.

As described above, by employing the reduced set RS, it is possible to reduce an encoding amount of the encoded data #1.

Note that the encoded data #1 may not include the sub block position information #Ln. For example, by setting, in advance, a sub block scanning order so that the sub block scanning order is used in both the encoding and the decoding in common, it becomes possible to determine a position of a sub block on the basis of information indicating a number of the sub block in the encoded data #1 in the sub block scanning order.

<Example of Application to Another Prediction Parameter>

In the above explanation, the prediction mode in the intra prediction is mainly used as the prediction parameter, as an example. Note, however, that the present invention is not limited to this. The present invention is also applicable to another parameter generally used in generation of a prediction image in an encoding process/decoding process of a video.

The following description deals with (i) an example in which the present invention is applied to a case where a motion vector in motion compensation prediction is used as the prediction parameter and (ii) an example in which the present invention is applied to a case where a weighting factor in luminance compensation prediction is used as the prediction parameter.

(Example of Application to Motion Vector)

In the motion compensation prediction, a position in a region on a decoded image used in prediction of a prediction target sub block is represented by a prediction parameter called "motion vector".

The motion vector is selected from a prediction parameter set in which the number of elements depends on a size of an image and an accuracy (compensation accuracy). For example, in a case where (i) W is a width (the number of pixels in a horizontal direction) of an image, H is a height (the number of pixels in a vertical direction) of the image, and a compensation accuracy of the image is 0.25 pixel, a motion vector V is selected from a prediction parameter set S defined by the following formula.

$$S=\{V|V=((N/4),(M/4))$$

(where: N is an integer satisfying an inequality of $0 \leq N < 4W$; and M is an integer satisfying an inequality of $0 \leq M < 4H$).

In a case where the prediction parameter is such a motion vector, the first prediction parameter determination section 53 determines a motion vector for each of the plurality of sub blocks belonging to the first group, and assigns the motion vector to the sub block. Further, the first parameter decoding section 43 can decode the motion vector for each of the plurality of sub blocks belonging to the first group.

Each of the reduced set derivation sections 44 and 54 can generate the reduced set RS by use of with the motion vector assigned to each of the plurality of sub blocks belonging to the first group. Furthermore, each of the reduced set derivation sections 44 and 54 can generate the reduced set RS by use of motion vectors assigned to sub blocks in the vicinity of the prediction target sub block, as described above.

As to each of the other sections of the video decoding device 1 and the video encoding device 2, it is possible to reduce an encoding amount of the prediction parameters included in the encoded data #1 by carrying out the same operations as those of the aforementioned arrangement employing a prediction mode as the prediction parameter.

Note that, in a case where the prediction parameter is a motion vector, it is possible to have, for example, an arrangement in which each of the reduced set derivation sections 44 and 54 adds, to the reduced set RS, such a motion vector that a norm of a difference vector between the motion vector and a motion vector assigned to a sub block in the vicinity of the prediction target sub block is not more than a certain value.

Generally, in a case where the prediction parameter is a motion vector, the prediction parameter set includes a large number of prediction vectors. For example, the number of motion vectors included in the prediction parameter set S described above is 8000×4000 (W=2000, H=1000).

Meanwhile, the number of motion vectors accumulated in the reduced set RS has an upper limit which is equal to (i) the number of sub blocks belonging to the first group, or (ii) the number of sub blocks in the vicinity of the prediction target sub block. For example, even in a case where the sub blocks included in the proximity sub block region NSR shown in (b) of FIG. 8 are used, the number of motion vectors accumulated in the reduced set RS is only 24.

Accordingly, depending on a characteristic of a target image of the encoding/decoding, the number of motion vectors accumulated in the reduced set RS might be not sufficient even in a case where the reduced set RS is generated only with the motion vectors assigned to the sub blocks in the vicinity of the prediction target sub block. This might cause a reduction in prediction accuracy, and an increase in encoding amount of residual data. By adding, to the reduction ser RS, such a motion vector that a norm of a difference vector between the motion vector and another motion vector assigned to a sub block located in the vicinity of the prediction target sub block is not more than a certain value, it is possible to reduce an encoding amount of the prediction parameters without having an increase in encoding amount of residual data.

(Example of Application to Weighting Factor in Luminance Compensation Prediction)

In luminance compensation prediction, a luminance of the prediction target sub block is predicted by use of a value obtained by multiplying, by a weighting factor, each of a plurality of luminances of reference pictures, which are referred to in motion compensation prediction of a prediction target sub block.

The present invention can be applied to a case where the weighting factor is used as a prediction parameter. For example, each of the reduced set derivation sections 44 and 54 can generate the reduced set RS on the basis of the weighting factor assigned to a sub block located in the vicinity of the prediction target sub block.

Note that, in a case where the present invention is applied to the weighting factor, (i) a plurality of values, each of which is used as the weighting factor, may be associated with, respectively, a plurality of representative values, a total number of which is set in advance, and (ii) the plurality of representative values may be used as prediction parameters.

For example, in a case where a value W of a weighting factor can be one of real values (or values having a predetermined digit number) satisfying an inequality of $0 \leq W \leq 1$, all values Wn of the weighting factor, satisfying an inequality of $(n/X) \leq Wn \leq ((n+1)/X)$, are associated with representative values w, respectively, and the representative values w are used as prediction parameters. Here, X is a natural number, and n is an integer satisfying an inequality of $0 \leq n \leq X-1$. With such association, all the real values satisfying an inequality of $0 \leq W \leq 1$ can be mapped in a set of representative values Wn, a total number of which is X. Further, a specific value of X is set so that the encoding amount of the encoded data becomes small, for example.

As described above, by limiting the number of elements used as prediction parameters within a predetermined range, it becomes possible to reduce the encoding amount of the encoded data, as compared with a case where the weighting factor itself is used as a prediction parameter.

(Additional Matters)

An image encoding device of the present invention, for encoding a difference between an input image and a prediction image, includes: classification means for (i) dividing a prediction image into a plurality of unit regions and (ii) classifying a plurality of prediction units included in each of the plurality of unit regions into a first group and a second group; first selection means for selecting, for each of a plurality of prediction units belonging to the first group, a prediction parameter designating how to generate a prediction image, the first selection means selecting the prediction parameter from a basic set constituted by predetermined prediction parameters; second selection means for selecting, for each of a plurality of prediction units belonging to the second group, a prediction parameter designating how to generate a prediction image, the second selection means selecting the prediction parameter from a reduced set which (i) includes at least a part of the prediction parameter(s) selected by the first selection means and (ii) is constituted by a prediction parameter(s), the number of which is not more than the number of prediction parameters included in the basic set; and prediction parameter encoding means for encoding (i) information indicating which one of prediction parameters is selected, for each of the plurality of prediction units belonging to the first group, by the first selection means and (ii) information indicating which one of prediction parameters is selected, for each of the plurality of prediction units belonging to the second group, by the second selection means.

According to the image encoding device having the arrangement described above, for each of the plurality of prediction units belonging to the second group, a prediction parameter designating how to generate a prediction image is selected from the reduced set which (i) includes at least a part of the prediction parameter(s) selected by the first selection means for each of the plurality of prediction units belonging to the first group which is included in the unit region in which the second group is included, and (ii) is constituted by a prediction parameter(s), the number of which is not more than the prediction parameters included in the basic set. The information indicating which one of prediction parameters is selected by the second selection means is encoded.

Here, generally, a prediction parameter with respect to each of the plurality of prediction units has a correlation with a prediction parameter with respect to another prediction unit located in the vicinity of the prediction unit. For this reason, the prediction parameter selected with respect to each of the plurality of prediction units belonging to the first group is highly likely to be an optimum prediction parameter with respect to each of the plurality of prediction units belonging to the second group. That is, the parameter selected from the reduced set is highly likely to be an optimum prediction parameter with respect to each of the plurality of prediction units belonging to the second group. Accordingly, with the arrangement described above, it is possible to encode a prediction parameter without having a reduction in encoding efficiency.

Further, with the arrangement described above, the reduced set includes at least a part of the prediction parameter(s) selected by the first selection means, and is constituted by prediction parameters, the number of which is not more than the number of prediction parameters included in the basic set. Accordingly, for each of the plurality of prediction units belonging to the second group, it is possible to have a reduction in encoding amount of information indicating which one of prediction parameters has been selected.

According to the arrangement described above, it is therefore possible to have a reduction in encoding amount of information designating a prediction parameter, without having a reduction in encoding efficiency.

Furthermore, it is preferable that the reduced set is constituted by only prediction parameters that (i) are selected by the first selection means and (ii) are different from each other.

According to the arrangement, it is possible to further reduce the number of prediction parameters included in the reduced set. Accordingly, it is possible to further reduce an encoding amount. More specifically, prediction parameters generally have a spatial correlation with each other, so that distribution of optimum prediction parameters with respect to a plurality of prediction units in a certain region becomes inhomogeneous. For this reason, it is highly likely that, in the certain region, only a part of various prediction parameters included in the basic set is used. Accordingly, the number of prediction parameters in a certain region, selected by the first selection means, is highly likely to be smaller than the number of prediction parameters included in the basic set. For this reason, by employing, as the reduced set, a group of all the prediction parameters which (i) are selected by the first selection means and (ii) are different from each other, it is possible to reduce the number of elements of the reduced set.

Moreover, it is preferable that each of the plurality of unit regions is a unit used in encoding carried out by the image encoding device.

According to the arrangement, the generation process of the reduced set is carried out only once per encoding unit (e.g., each macro block defined in the H.264/MPEG-4 AVC standard). Accordingly, it is possible to reduce an amount of the process for generating the reduced set.

Further, the image encoding device of the present invention is preferably arranged such that the plurality of prediction units belonging to the first group and the plurality of prediction units belonging to the second group are arranged to form a checkered pattern (checker board pattern).

Generally, a prediction parameter with respect to each of a plurality of prediction units has a correlation with a prediction parameter with respect to another prediction unit located in the vicinity of the prediction unit.

According to the arrangement, the plurality of prediction units belonging to the first group and the plurality of prediction units belonging to the second group are arranged to form the checkered pattern (checker board pattern). Accordingly, a prediction parameter selected with respect to each of the plurality of prediction units belonging to the first group is highly likely to be an optimum prediction parameter with respect to each of the plurality of prediction units belonging to the second group.

According to the arrangement, it is thus possible to reduce an encoding amount necessary for the encoding of a prediction parameter, without sacrificing encoding efficiency.

Furthermore, each of the prediction parameters can be a prediction parameter designating a prediction mode in intra prediction.

According to the arrangement, it is possible to reduce an encoding amount necessary for encoding of a prediction mode in intra prediction, without sacrificing encoding efficiency.

Moreover, it is preferable that the reduced set (i) includes the prediction parameter(s) selected by the first selection means and (ii) includes at least one of a vertical direction prediction mode in the intra prediction, a horizontal direction prediction mode in the intra prediction, and a DC prediction mode in the intra prediction, and, for each of the plurality of prediction units belonging to the second group, the second selection means selects, from the reduced set, the prediction parameter designating how to generate a prediction image.

Generally, the vertical direction prediction mode, the horizontal direction prediction mode, and the DC prediction mode are highly frequently selected in the intra prediction.

According to the arrangement, it is possible that the second selection means selects, for each of the plurality of prediction units belonging to the second group, a prediction parameter designating how to generate a prediction image, and the second selection means selects the prediction parameter from the reduced set which (i) includes the prediction parameter(s) selected by the first selection means and (ii) includes one of the vertical direction prediction mode in the intra prediction, the horizontal direction prediction mode in the intra prediction, and the DC prediction mode in the intra prediction. Accordingly, it is possible to reduce an encoding amount without having a reduction in prediction accuracy in generation of a prediction image for each of the plurality of prediction units belonging to the second group.

Further, it is possible that the second selection means selects the prediction parameter in such a manner that (i), in a case where the number of a plurality of prediction units in each of the plurality of unit regions, constituted by the plurality of prediction units belonging to the first group and the plurality of prediction units belonging to the second group, is not less than a predetermined threshold value, the second selection means selects a prediction parameter from the reduced set, and (ii), in a case where said number is less than the predetermined threshold value, the second selection means selects a prediction parameter from the basic set.

According to the arrangement, it is possible to select a prediction parameter from the basic set in a case where the number of prediction units in the unit region is less than the predetermined value. It is therefore possible to reduce an amount of a process for selecting a prediction parameter.

The image encoding device of the present invention can be arranged such that the basic set is capable of being set per unit region, and the second selection means selects the prediction parameter in such a manner that (i), in a case where the basic set, which is set with respect to each of the plurality of unit regions, constituted by the plurality of prediction units belonging to the first group and the plurality of prediction units belonging to the second group, satisfies a specific condition, the second selection means selects a prediction parameter from the reduced set, and (ii), in a case where the basic set does not satisfy the specific condition, the second selection means selects a prediction parameter from the basic set.

According to the arrangement, it is possible that the basic set is capable of being set per unit region, and the second selection means selects the prediction parameter in such a manner that (i), in a case where the basic set, which is set with respect to each of the plurality of unit regions, constituted by the plurality of prediction units belonging to the first group and the plurality of prediction units belonging to the second group, satisfies a specific condition, the second selection means selects a prediction parameter from the reduced set, and (ii), in a case where the basic set does not satisfy the specific condition, the second selection means selects a prediction parameter from the basic set. Accordingly, it is possible to reduce an encoding amount while reducing an amount of a process for selecting a prediction parameter.

Moreover, an image encoding device of the present invention can be expressed as an image encoding device for encoding a difference between an input image and a prediction image, including: selection means for selecting, for each of a plurality of prediction units, a prediction parameter designating how to generate a prediction image, the selection means selecting the prediction parameter from a reduced set including at least a part of a prediction parameter(s) designating how to generate a prediction image(s) for a prediction unit(s) which (i) is located in the vicinity of a corresponding one of the plurality of prediction units and (ii) has been encoded; and prediction parameter encoding means for encoding, for each of the plurality of prediction units, information indicating which one of prediction parameters has been selected by the selection means.

Generally, a prediction parameter with respect to each of a plurality of prediction units has a correlation with a prediction parameter with respect to another prediction unit located in the vicinity of the prediction unit. Accordingly, the reduced set is highly likely to include an optimum prediction parameter in generation of a prediction image of each of the plurality of prediction units. Further, the reduced set is constituted by at least a part of the prediction parameter(s) with respect to the prediction unit(s) which is located in the vicinity of a corresponding one of the plurality of prediction units. Accordingly, the number of prediction parameters included in the reduced set is smaller than the number of prediction parameters included in a parameter set constituted by prediction parameters with respect to prediction units other than the each of the plurality of prediction units.

According to the image encoding device of the present invention, having the arrangement described above, it is therefore possible to generate encoded data whose encoding amount is small, without sacrificing encoding efficiency.

Further, it is preferable that the prediction parameter encoding means employs, as a code indicating which one of prediction parameters is selected by the second selection means, a code having a length shorter than that of a code indicating which one of prediction parameters is used by the first selection means.

According to the arrangement, prediction parameter encoding means can employ, as a code indicating which one of prediction parameters is selected by the second selection means, a code having a length shorter than that of a code indicating which one of prediction parameters is used by the first selection means. Accordingly, it is possible to encode, for each of the plurality of prediction units belonging to the second group, by use of the code having a short length, information indicating which one of prediction parameters is selected.

Furthermore, it is preferable that the reduced set (i) includes the prediction parameter(s) selected by the first selection means, and (ii) is constituted by a prediction parameter(s), the number of which is $2^n+1$ (n is a natural number), and, for each of the plurality of prediction units belonging to the second group, the second selection means selects, from the reduced set, the prediction parameter designating how to generate a prediction image.

Generally, in a case where a group of elements, the number of which is $2^n+1$ (n is a natural number), is encoded, compression efficiency is improved as compared with a case where a group of elements, the number of which is not $2^n+1$, is encoded.

According to the arrangement, it is possible to encode, for each of the plurality of prediction units belonging to the second group, information indicating which one of prediction parameters is selected from the reduced set that (i) includes the prediction parameter(s) selected by the first selection means, and (ii) is constituted by prediction parameters, the number of which is $2^n+1$ (n is a natural number). Accordingly, it is possible to have an additional effect of enhancing compression efficiency in encoding a prediction parameter.

Further, an image decoding device of the present invention, for decoding encoded data which is obtained in such a manner that (i) a difference between an original image and a prediction image is encoded for each of a plurality of prediction units, and, simultaneously, (ii) selection information is encoded, the selection information indicating which one of a plurality of prediction parameters, each designating how to generate a prediction image, is selected for each of the plurality of prediction units, includes: classification means for classifying a plurality of prediction units included in each of a plurality of unit regions constituting the prediction image into a first group and a second group; first selection means for selecting, for each of the plurality of prediction units belonging to the first group, a prediction parameter designating how to generate a prediction image, the first selection means selecting, by referring to selection information for each of a plurality of prediction units belonging to the first group, the prediction parameter from a basic set constituted by predetermined prediction parameters; and second selection means for selecting, for each of the plurality of prediction parameters belonging to the second group, a prediction parameter designating how to generate a prediction image, the second selection means selecting, by referring to selection information for each of a plurality of prediction units belonging to the second group, the prediction parameter from a reduced set which (i) includes at least a part of the prediction parameter(s) selected by the first selection means and (ii) is constituted by a prediction parameter(s), the number of which is not more than the number of the predetermined prediction parameters included in the basic set.

According to the image decoding device having the arrangement described above, it is possible to select, for each of the plurality of prediction units belonging to the second group, a prediction parameter designating how to generate a prediction image, from the reduced set which (i) includes at least a part of the prediction parameter(s) selected by the first selection means for each of the plurality of prediction units belonging to the first group which is included in the unit region to which the second group belongs, and (ii) is constituted by a prediction parameter(s), the number of which is not more than the number of prediction parameters included in the basic set.

Here, generally, a prediction parameter with respect to each of the prediction units has a correlation with a prediction parameter with respect to another prediction unit located in the vicinity of the prediction unit. Accordingly, the prediction parameter selected for each of the plurality of prediction units belonging to the first group is highly likely to be an optimum prediction parameter with respect to each of the plurality of prediction units belonging to the second group. With the arrangement described above, it is therefore possible to decode, without having a reduction in encoding efficiency, the prediction parameter from selection information having a reduction in encoding amount.

Furthermore, it is preferable that the reduced set includes only prediction parameters that (i) are selected by the first selection means and (ii) are different from each other.

According to the arrangement, it is possible to further reduce the number of prediction parameters included in the reduced set. Accordingly, it is possible to further reduce an encoding amount.

Moreover, it is preferable that each of the plurality of unit regions is a unit used in decoding carried out by the image decoding device.

According to the arrangement, it is possible to carry out a process for generating the reduced set only once per decoding unit (e.g., each macro block defined in the H.264/MPEG-4 AVC standard). Accordingly, it is possible to reduce an amount of the process for generating the reduced set.

Further, the image decoding device of the present invention is preferably arranged such that the plurality of prediction units belonging to the first group and the plurality of prediction units belonging to the second group are arranged to form a checkered pattern (checker board pattern).

Generally, a prediction parameter with respect to each of a plurality of prediction units has a correlation with a prediction parameter with respect to another prediction unit located in the vicinity of the prediction unit.

According to an image encoding device having an arrangement corresponding to the arrangement described above, the plurality of prediction units belonging to the first group and the plurality of prediction units belonging to the second group are arranged to form the checkered pattern (checker board pattern). Accordingly, it is possible to select an optimum prediction parameter with respect to each of the plurality of prediction units belonging to the second group. According to the image encoding device having the arrangement corresponding to the arrangement described above, it is therefore possible to reduce an encoding amount necessary for the encoding of a prediction parameter, without sacrificing encoding efficiency.

According to the image decoding device having the arrangement described above, it is possible to decode the encoded data whose encoding amount is reduced in the manner described above.

Furthermore, the image decoding device of the present invention can be arranged such that each of the prediction parameters is a prediction parameter designating a prediction mode in intra prediction.

According to the arrangement described above, it is possible to decode, without sacrificing encoding efficiency, such encoded data that, in the intra prediction, an encoding amount of prediction modes is reduced.

Moreover, it is preferable that the reduced set (i) includes the prediction parameter(s) selected by the first selection means and (ii) includes at least one of a vertical direction prediction mode in the intra prediction, a horizontal direction prediction mode in the intra prediction, and a DC prediction mode in the intra prediction, and for each of the plurality of prediction units belonging to the second group, the second selection means selects, from the reduced set, the prediction parameter designating how to generate a prediction image.

Generally, the vertical direction prediction mode, the horizontal direction prediction mode, and the DC prediction mode are highly frequently selected in the intra prediction.

According to an image encoding device having an arrangement corresponding to the arrangement described above, it is possible that the second selection means selects, for each of the plurality of prediction units belonging to the second group, a prediction parameter designating how to generate a prediction image, and the second selection means selects the prediction parameter from the reduced set which (i) includes the prediction parameter(s) selected by the first selection means and (ii) includes one of the vertical direction prediction mode in the intra prediction, the horizontal direction prediction mode in the intra prediction, and the DC prediction mode in the intra prediction. Accordingly, it is possible to reduce an encoding amount without having a reduction in prediction accuracy in generation of a prediction image for each of the plurality of prediction units belonging to the second group.

According to the image decoding device having the arrangement described above, it is possible to decode the encoded data whose encoding amount is reduced in the manner described above.

Further, the image decoding device of the present invention can be arranged such that the second selection means selects the prediction parameter in such a manner that (i), in a case where the number of a plurality of prediction units in each of the plurality of unit regions, constituted by the plurality of prediction units belonging to the first group and the plurality of prediction units belonging to the second group, is not less than a predetermined threshold value, the second selection means selects a prediction parameter from the reduced set, and (ii), in a case where said number is less than the predetermined threshold value, the second selection means selects a prediction parameter from the basic set.

According to the arrangement, it is possible to select a prediction parameter from the basic set in a case where the number of prediction units in the unit region is less than the predetermined value. It is therefore possible to reduce an amount of a process for selecting a prediction parameter.

Furthermore, the image decoding device of the present invention can be arranged such that the basic set is capable of being set per unit region, and the second selection means selects the prediction parameter in such a manner that (i), in a case where the basic set, which is set with respect to each of the plurality of unit regions, constituted by the plurality of prediction units belonging to the first group and the plurality of prediction units belonging to the second group, satisfies a specific condition, the second selection means selects a prediction parameter from the reduced set, and (ii), in a case where the basic set does not satisfy the specific condition, the second selection means selects a prediction parameter from the basic set.

According to the arrangement, it is possible that the basic set is capable of being set per unit region, and the second selection means selects the prediction parameter in such a manner that (i), in a case where the basic set, which is set with respect to each of the plurality of unit regions, constituted by the plurality of prediction units belonging to the first group and the plurality of prediction units belonging to the second group, satisfies a specific condition, the second selection means selects a prediction parameter from the reduced set, and (ii), in a case where the basic set does not satisfy the specific condition, the second selection means selects a prediction parameter from the basic set. Accordingly, it is possible to decode the encoded data whose encoding amount is reduced, while reducing an amount of a process for selecting a prediction parameter.

Moreover, an image decoding device of the present invention can be expressed as an image decoding device for decoding encoded data which is obtained in such a manner that (i) a difference between an input image and a prediction image is encoded for each of a plurality of prediction units, and, simultaneously, (ii) selection information is encoded, the selection information indicating which one of a plurality of prediction parameters, each designating how to generate a prediction image, is selected for each of the plurality of prediction units, including: selection means for selecting, for each of a plurality of prediction units, a prediction parameter designating how to generate a prediction image, the selection means selecting the prediction parameter from a reduced set including at least a part of a prediction parameter(s) designating how to generate a prediction image(s) for a prediction unit(s) which (i) is located in the vicinity of a corresponding one of the plurality of prediction units and (ii) has been decoded.

Generally, a prediction parameter with respect to each of a plurality of prediction units has a correlation with a prediction parameter with respect to another prediction unit located in the vicinity of the prediction unit. Accordingly, the reduced set is highly likely to include an optimum prediction parameter in generation of a prediction image of each of the plurality of prediction units. Further, the reduced set is constituted by at least a part of the prediction parameter(s) with respect to the prediction unit(s) which is located in the vicinity of a corresponding one of the plurality of prediction units. Accordingly, the number of prediction parameters included in the reduced set is smaller than the number of prediction parameters included in a parameter set constituted by prediction parameters with respect to prediction units other than the each of the plurality of prediction units.

According to an image encoding device having an arrangement corresponding to the arrangement described above, it is therefore possible to generate encoded data whose encoding amount is small, without sacrificing encoding efficiency.

The image decoding device having the arrangement described above can decode the encoded data whose encoding amount is small as described above.

Further, it is preferable that the reduced set (i) includes the prediction parameter(s) selected by the first selection means, and (ii) is constituted by prediction parameters, the number of which is $2^n+1$ (n is a natural number), and, for each of the plurality of prediction units belonging to the second group, the second selection means selects, from the reduced set, the prediction parameter designating how to generate a prediction image.

Generally, in a case where a group of elements, the number of which is $2^n+1$ (n is a natural number), is encoded, compression efficiency is improved as compared with a case where a group of elements, the number of which is not $2^n+1$, is encoded.

According to the arrangement described above, it is possible to decode the encoded data having such high compression efficiency.

Furthermore, a data structure of the present invention, for encoded data which is obtained in such a manner that (i) a difference between an input image and a prediction image is encoded for each of a plurality of prediction units, and, simultaneously, (ii) selection information is encoded, the selection information indicating which one of a plurality of prediction parameters, each designating how to generate a prediction image, is selected for each of the plurality of prediction units, includes: selection information which is referred to in an image decoding device for decoding the encoded data, so as to select, for each of the plurality of prediction units, a prediction parameter designating how to generate a prediction image, the prediction parameter being selected from a reduced set which includes at least a part of a prediction parameter(s) designating how to generate a prediction image(s) for a prediction unit(s) which (i) is located in the vicinity of a corresponding one of the plurality of prediction units and (ii) has been decoded.

Generally, a prediction parameter with respect to each of a plurality of prediction units has a correlation with a prediction parameter with respect to another prediction unit located in the vicinity of the prediction unit. Accordingly, the reduced set is highly likely to include an optimum prediction parameter in generation of a prediction image of each of the plurality of prediction units. Further, the reduced set is constituted by at least a part of the prediction parameter(s) with respect to the prediction unit(s) which is located in the vicinity of a corresponding one of the plurality of prediction units. Accordingly, the number of prediction parameters included in the reduced set is smaller than the number of prediction parameters included in a parameter set constituted by prediction parameters with respect to prediction units other than the each of the plurality of prediction units.

Accordingly, the encoded data having the structure described above is the encoded data whose encoding amount is reduced without sacrificing encoding efficiency.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably applicable to an image encoding device for generating encoded data by encoding an image, and an image decoding device for decoding the encoded data generated by such an image encoding device.

REFERENCE SIGNS LIST

1: Video decoding device
14: MB decoding section
144: Prediction parameter decoding section
41: Group determination section (classification means)
42: Switch section
43: First prediction parameter decoding section (first selection means)
44: Reduced set derivation section
45: Second prediction parameter decoding section (second selection means)
2: Video encoding device
24: MB encoding section
242: Prediction parameter determination section
51: Group determination section (classification means)
52: Switch section
53: First prediction parameter determination section (first selection means)
54: Reduced set derivation section
55: Second prediction parameter determination section (second selection means)
243: Prediction parameter encoding section (prediction parameter encoding means)
248: Prediction image generation section

The invention claimed is:

1. An image decoding device for decoding encoded data which is obtained in such a manner that (i) a difference between an input image and a prediction image is encoded for each of a plurality of prediction units, and (ii) a prediction parameter used to generate the prediction image is encoded, the image decoding device comprising:

prediction parameter decoding means for decoding a prediction parameter which is to be applied to each of the plurality of prediction units;

reduced set creating means for creating a reduced set which is a group of prediction parameters; and second prediction parameter decoding means for (i) decoding a first prediction parameter which specifies a prediction parameter included in a basic set or (ii) decoding a second prediction parameter from a bit sequence having a length determined in accordance with the number of prediction parameters included in the reduced set, the second prediction parameter specifying a prediction parameter included in the reduced set, the reduced set including at least one prediction parameter included in a prediction unit region in the vicinity of a target prediction unit selected from the plurality of prediction units, the number of prediction parameters included in the reduced set being less than the number of prediction parameters included in the basic set which is constituted by predetermined prediction parameters, the prediction parameter decoding means carrying out decoding *of the prediction parameter*, in accordance with a value of a flag which is included, per prediction unit, in the encoded data, so that (i) the prediction parameter is decoded by use of the first prediction parameter decoded by the second prediction parameter decoding means or (ii) the prediction parameter is decoded by use of the second prediction parameter decoded by the second prediction parameter decoding means, and in a case where the prediction parameters which are identical with each other exist in at least two prediction parameters included in the prediction unit region in the vicinity of the target prediction unit, the prediction parameter decoding means causing the reduced set to include one of the prediction parameters which are identical with each other, and carrying out decoding[,] *of the at least one prediction parameter* per prediction unit[, the at least one prediction parameter included in the reduced set].

2. The image decoding device as set forth in claim 1, wherein:

each of the prediction parameters is a motion vector used in motion compensation prediction.

3. The image decoding device as set forth in claim 1, said second prediction parameter decoding means, in accordance with the value of the flag, (i) decoding a first prediction parameter which specifies a prediction parameter included in a basic set or (ii) decoding a second prediction parameter from a bit sequence having a length determined in accordance with the number of prediction parameters included in the reduced set, the second prediction parameter specifying a prediction parameter included in the reduced set.

4. An image encoding device for encoding a difference between an input image and a prediction image, comprising:

prediction parameter encoding means for encoding a prediction parameter which is applied to each of a plurality of prediction units;

reduced set creating means for creating a reduced set which is a group of prediction parameters; and second prediction parameter determination means for (i) determining a first prediction parameter which specifies a prediction parameter included in a basic set or (ii) determining a second prediction parameter which specifies a prediction parameter included in a reduced set, the reduced set including at least one prediction parameter included in a prediction unit region in the vicinity of a target prediction unit selected from the plurality of prediction units, the number of prediction parameters included in the reduced set being less than the number of prediction parameters included in a basic set, the prediction parameter encoding means encoding *the prediction parameter*, per prediction unit, *and* a flag for designating that (i) the prediction parameter is encoded by use of the first prediction parameter determined by the second prediction parameter determination means or (ii) the prediction parameter is encoded by use of the second prediction parameter determined by the second prediction parameter determination means, and in a case where the prediction parameters which are identical with each other exist in at least two prediction parameters included in the prediction unit region in the vicinity of the target prediction unit, the prediction parameter encoding means causing the reduced set to include one of the prediction parameters which are identical with each other, and carrying out encoding[,] *of the at least one prediction parameter* per prediction unit[, the at least one prediction parameter included in the reduced set].

5. The image encoding device as set forth in claim 4, said second prediction parameter determination means, in accordance with the value of the flag, (i) determining a first prediction parameter which specifies a prediction parameter included in a basic set or (ii) determining a second prediction parameter which specifies a prediction parameter included in a reduced set.

* * * * *